(12) United States Patent
Mills et al.

(10) Patent No.: US 8,186,544 B2
(45) Date of Patent: *May 29, 2012

(54) DISPENSING DEVICE FOR EDIBLE GOODS AND/OR NOVELTIES

(75) Inventors: Stephen B. Mills, Atkinson, NH (US); Stevenson Tom, Nashua, NH (US)

(73) Assignee: Brookstone Purchasing, Inc., Merrimack, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/238,709

(22) Filed: Sep. 21, 2011

(65) Prior Publication Data

US 2012/0024891 A1 Feb. 2, 2012

Related U.S. Application Data

(63) Continuation of application No. 12/844,981, filed on Jul. 28, 2010.

(51) Int. Cl.
*G01F 11/24* (2006.01)

(52) U.S. Cl. ......... 222/52; 222/63; 222/333; 222/185.1; 222/413; 222/639; 222/643; 222/462; 141/360; 141/370; 221/13; 221/265; 221/281

(58) Field of Classification Search ............ 222/52, 222/63, 333, 412, 413, 639, 642–644, 650, 222/185.1, 196, 198, 200, 201, 460, 462; 141/360, 361, 192, 256, 370, 375; 221/9, 221/13, 264, 265, 281, 282, 284, 200, 202–204

See application file for complete search history.

(56) References Cited

U.S. PATENT DOCUMENTS

| | | | | |
|---|---|---|---|---|
| 5,305,915 A | * | 4/1994 | Kamysz et al. | 222/63 |
| 5,826,754 A | * | 10/1998 | Ishaya et al. | 222/185.1 |
| 5,988,461 A | * | 11/1999 | Edney et al. | 222/638 |
| 6,401,657 B1 | | 6/2002 | Krishnamurthy | |
| 7,108,199 B1 | * | 9/2006 | Brown | 239/70 |
| 2004/0226962 A1 | * | 11/2004 | Mazursky et al. | 222/95 |
| 2006/0249531 A1 | | 11/2006 | Litchfield | |
| 2010/0314419 A1 | * | 12/2010 | Real et al. | 222/236 |

FOREIGN PATENT DOCUMENTS

WO 97/08977 3/1997

* cited by examiner

*Primary Examiner* — J. Casimer Jacyna

(74) *Attorney, Agent, or Firm* — Grossman Tucker Perreault & Pfleger, PLLC

(57) ABSTRACT

A dispensing device may include a main body including a wall having a dispensing mouth defined in the wall; a storage portion, wherein the storage portion is retained by the main body; and a conveyance path providing communication between the storage portion and the dispensing mouth. In addition, the dispensing device may include a conveyor disposed in the conveyance path; a drive motor mechanically coupled to the conveyor; and a sensor, wherein the sensor is directly or indirectly electrically coupled to the drive motor and the sensor is in optical communication with the environment proximate to the dispensing mouth.

10 Claims, 24 Drawing Sheets

DISPENSING DEVICE FOR EDIBLE GOODS AND/OR NOVELTIES

CROSS-REFERENCE TO RELATED APPLICATIONS

The present application is a continuation of U.S. patent application Ser. No. 12/844,981 filed Jul. 28, 2010, which is incorporated herein by reference.

TECHNICAL FIELD

The present invention relates to a dispensing device and more particularly, to an automated dispenser for edible goods and/or novelties.

BACKGROUND INFORMATION

Dispensers are often used to dispense various solid items, including edible goods, ice, coffee, pharmaceuticals or small toys. Dispensers may provide control in terms of the amount of a particular good dispensed or how or when the item is dispensed. In addition, dispensers may provide a relatively sanitary alternative to the candy dish commonly seen on a desk or a bucket of ice placed on a countertop. However, room for improvement and further development remains. For example, many dispensers may include a slide or an enclosed volume that may become jammed if items get caught during dispensing. In other examples, many dispensers, particularly candy dispensers, may be activated by touching the dispenser, spreading germs. Accordingly, further development in the art of dispensing goods may still be made, with improvements in the areas of sanitation, prevention of product jamming in the dispenser, accommodation of different sizes of items to be dispensed, metering the amount of product dispensed and convenience in manipulating the dispenser itself.

BRIEF DESCRIPTION OF THE DRAWINGS

These and other features and advantages will be better understood by reading the following detailed description, taken together with the drawings wherein.

DETAILED DESCRIPTION

In general, a dispensing device, consistent with the embodiments disclosed herein, enables dispensing of goods or items within the device by activation of a sensor that may trigger the metering of goods or items from a storage tank. Goods may include, for example, candy, gum, other food stuffs or novelty such as various trinkets, toys, etc., as well as office goods, including paper clips, binder clips, tacks, etc. In the exemplary non-exclusive embodiments described and shown, the dispensing device may include a main body, a stand supporting the main body, a tank mounted on the main body, a funnel within the tank and a lid for providing access to the interior of the tank. In further exemplary non-exclusive embodiments the dispensing device may also include a vibratory mechanism to prevent jamming of the items within the device when the items are dispensed. The vibratory mechanism may also reduce sticking or agglomerating of items in the storage tank, such as when, for example, food items are in the tank and begin to melt or fuse together.

Figure 1:
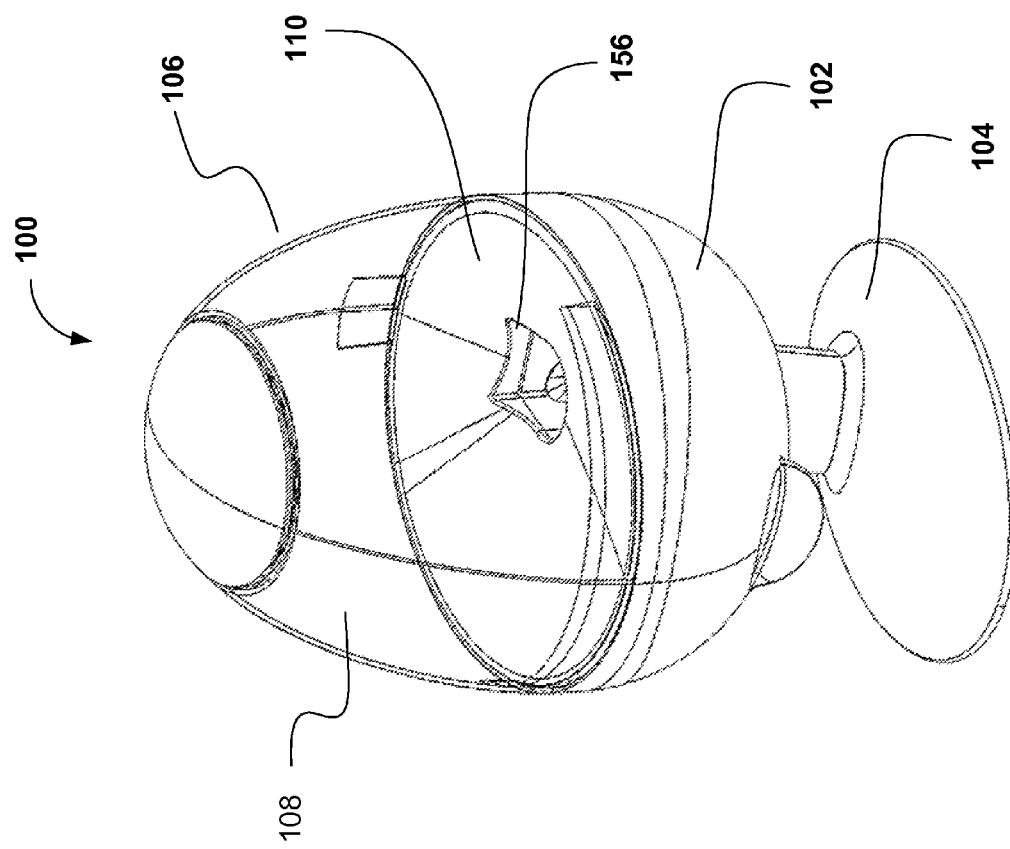
FIG. 1 illustrates a front perspective view of an embodiment of the dispensing device contemplated herein.

Referring to FIG. 1, an embodiment of a dispenser 100 may generally include main body 102, a stand 104 supporting the main body 102, a storage portion 106 retained by the main body 102, and a conveyance path providing communication between the main body and the storage portion for conveying items to be dispensed. While the dispenser 100, as illustrated, takes the form of a generally egg-like shape, it is contemplated that other shapes may be provided as well. The device may take the form of, for example, other geometric figures or objects including animals, planes, trains, automobiles, food items, building blocks, etc.

As illustrated in FIGS. 1 through 5, the dispensing device may include a tank 108, which in association with the funnel 110, may hold items to be dispensed. The tank 108 may be formed from a relatively clear or transparent material, i.e., a material that may allow for the transmission of incident light in the visible range of 380 nm to 750 nm, including all values and increments therein. The tank 108 may exhibit some degree of translucency, i.e., scattering of incident light. However, it may be appreciated that the material needs not be clear and may be, in some non-exclusive embodiments, opaque. Materials for fabricating the tank may include, polycarbonate, acrylic, glass, metal, metal alloys, polypropylene, polyethylene, etc.

Figure 2:
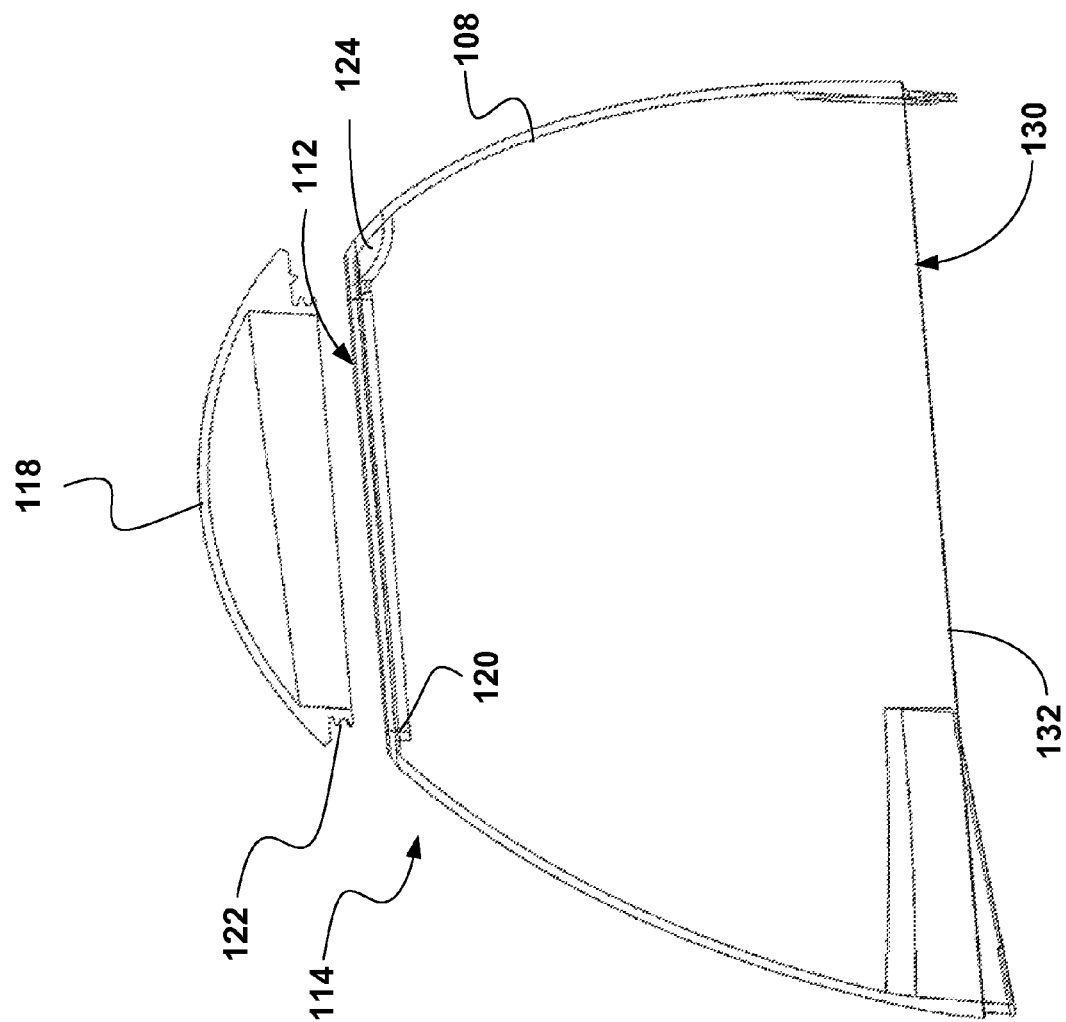
FIG. 2 illustrates an exploded, side cross-sectional view of an embodiment of a tank and lid.
Figure 3:
FIG. 3 illustrates a perspective cross-sectional view of an embodiment of a lid.

As illustrated in FIG. 2, the tank may include a fill opening 112 defined therein at a first end 114 of the tank 108. The fill opening 112 may accommodate the lid 118. The lid 118 may be retained within the fill opening 112 by mechanically interlocking with an interior surface 120 defining the fill opening 112. For example, mating threads may be provided on both the lid rim 122 and the interior surface 120 of the opening 112. In another illustrative example, frictional contact may be made between the lid rim 122 and the interior surface 120 of the fill opening 112. In such an example, a gasket 123 may be provided at the lid rim 122 or integrated into the lid rim 122 formed of a thermoplastic elastomer or a natural or synthetic rubber as illustrated in FIG. 3. In addition, to provide a mechanism to facilitate removing the lid 118 from the fill opening 112 when the lid 118 is retained by frictional contact, a depression 124 (illustrated in FIGS. 3 and 4) may be formed in the exterior surface 126 of the tank 108 allowing for a person to push against a surface 128 of the lid 118 (see FIG. 3) in a direction away from the fill opening 112 of the tank 108.

Figure 5:
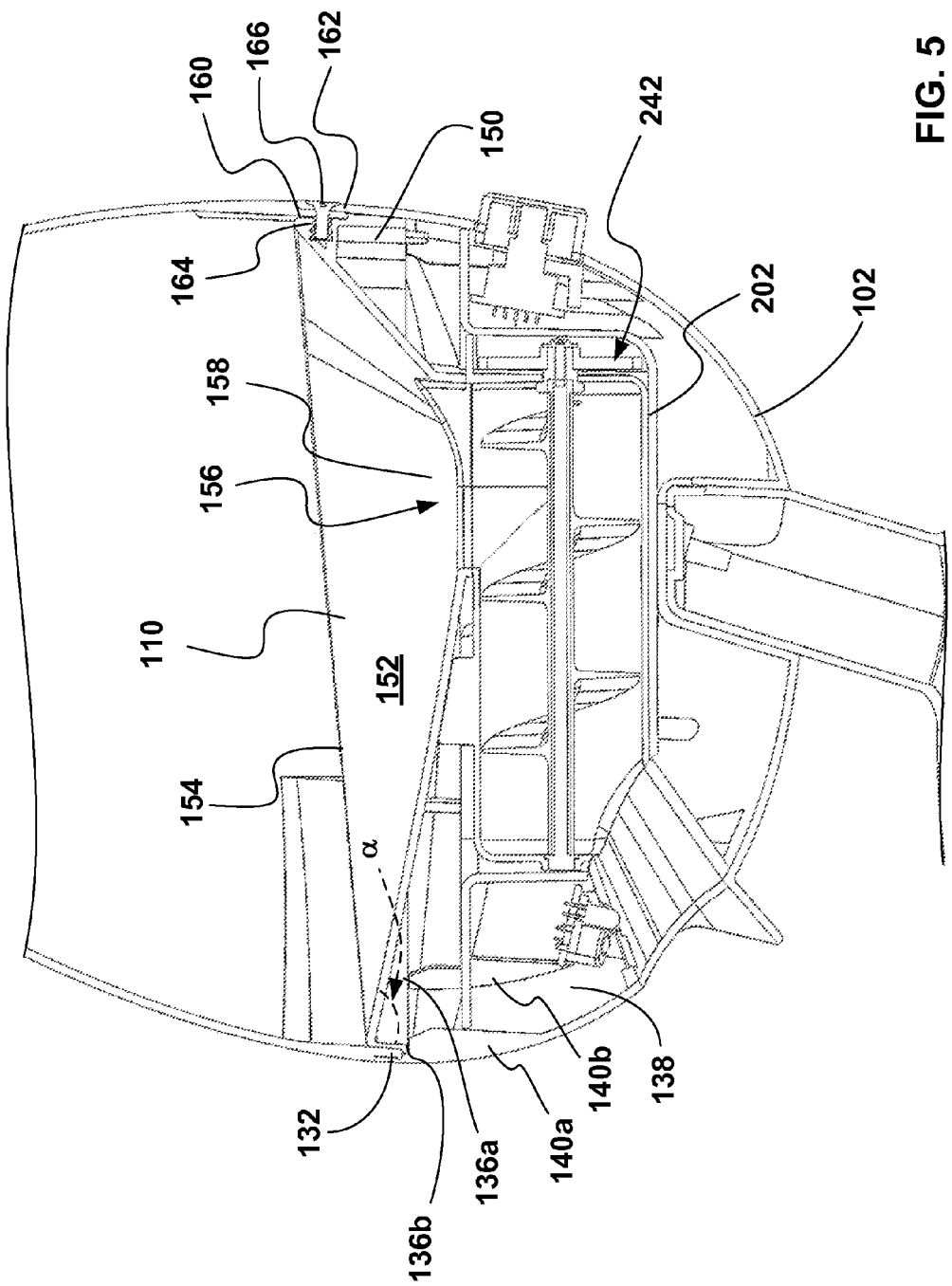
FIG. 5 illustrates a side cross-sectional view of an embodiment of an upper portion of the dispensing device.

Referring again to FIG. 2, the tank 108 may also include a second opening 130 defined by the bottom rim 132 of the tank 108. The bottom rim 132 of the tank may mate with the main body 102 as illustrated in FIG. 5, such that a portion of the bottom rim 132 may be received and/or retained by the main body 102. In one embodiment, as illustrated, the main body 102 may include one or more ledges 136a, 136b, etc. (hereinafter referred to as a ledge 136) defined in the main body 102 or extending from the main body wall 138 upon which the bottom rim 132 of the tank 108 may rest. The ledge 136 need not surround the entirety of the main body 102 but may be defined by one or more protrusions 140a, 140b, etc. which extend from the main body wall 138 on the interior portion of the main body 102. The bottom rim 132 and the main body 102 may mechanically interlock. For example, mating threads may be provided on both the bottom rim 132 and the main body 102. In other examples, the bottom rim 132 may be frictionally retained in the main body 102. In a further embodiment, the tank 108 may be affixed to the main body 102 such as by adhesives or welding of the tank 108 to the main body 102.

Also illustrated in FIG. 5 is an embodiment of the funnel 110. The funnel 110 may include a first peripheral wall 150 and a second interior wall 152, which may function to retain items to be dispensed within the tank 108. The first peripheral wall 150 and second peripheral wall 152 may define angle alpha ($\alpha$) near the top of the funnel 154, which may be in the range of 0 degrees to less than 90 degrees, including all values and increments therein such as from 0.1 to 89.9 degrees, 10 degrees, 30 degrees, etc. Furthermore, angle ($\alpha$) may vary around the funnel 110, such that one side of the funnel 110 may exhibit a first angle ($\alpha_1$) and another portion of the funnel 110 may exhibit a second angle ($\alpha_2$). It may also be understood that, in some examples, angle ($\alpha$) may vary continuously around the funnel 110. As noted above, the funnel 110 may include a funnel opening 156 defined near the bottom of the funnel 158 through which items may pass into the conveyance tube 202 (discussed further below) near the first end 242 of the conveyance tube. The funnel 110 may be formed of a number of materials, including metal or metal alloys, wood, glass, polymer materials including thermoplastics such as polypropylene, polyethylene, polycarbonate, acrylonitrile-butadiene-styrene, acrylic, and combinations thereof.

Figure 4:
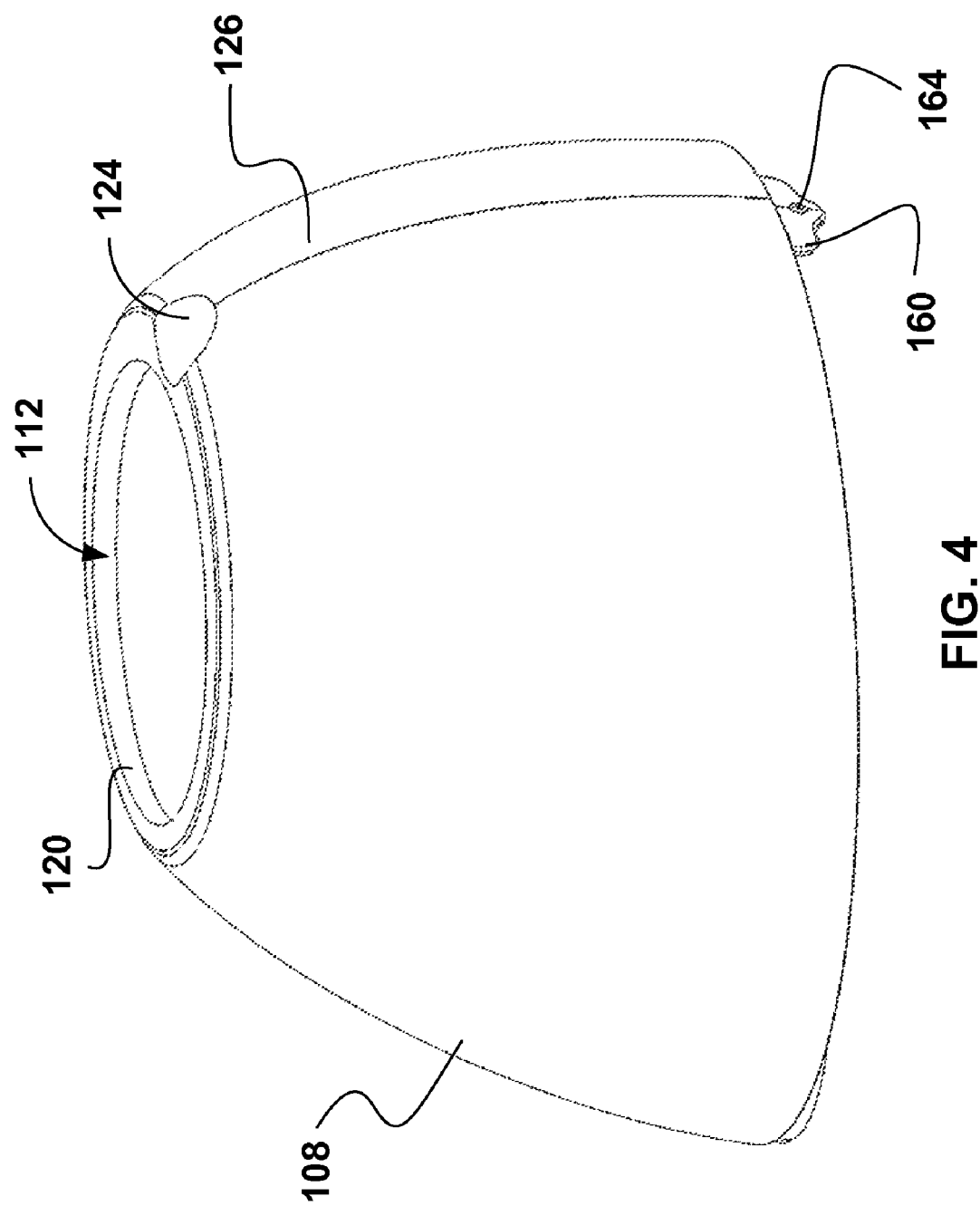
FIG. 4 illustrates a back perspective view of an embodiment of a tank.

The funnel 110 may also rest on the ledge 136 defined by the main body 102. As illustrated in FIG. 5, the funnel 110 may rest interior of the bottom rim 132 of the tank 108 on the ledge 136. However, it may be appreciated that, in some non-exclusive embodiments, the bottom rim 132 of the tank 108 may rest on the funnel 110, which in turn may rest on the ledge 136 defined by the main body 102. Further, the bottom rim 132 of the tank 108 may mechanically interlock with both the main body 102 and the funnel 110, such as through mating threads or frictional retention. In additional non-exclusive embodiments, the bottom rim 132 of the tank 108, the funnel 110 and the main body 102 may be adhesively joined together or welding together, such as by ultrasonic welding. In addition, as illustrated in FIGS. 4 and 5, the tank 108 may include a locating tab 160 and the main body 102 may include a notch 162 for receiving the locating tab 160. The locating tab 160 and the main body 102 may define a locating path 164 through which a mechanical fastener 166, such as a thumbscrew, slotted screw or pin may pass. In addition, the peripheral wall 150 of the funnel 110 may also define a portion of the locating path to retain the tank 108 and funnel 110 with relation to the main body 102. The mechanical fastener 166 may be removable or the mechanical fastener 166 may be locked in place, such as by ultrasonic welding, preventing access to the interior of the main body 102 through the tank 108.

Figure 8:
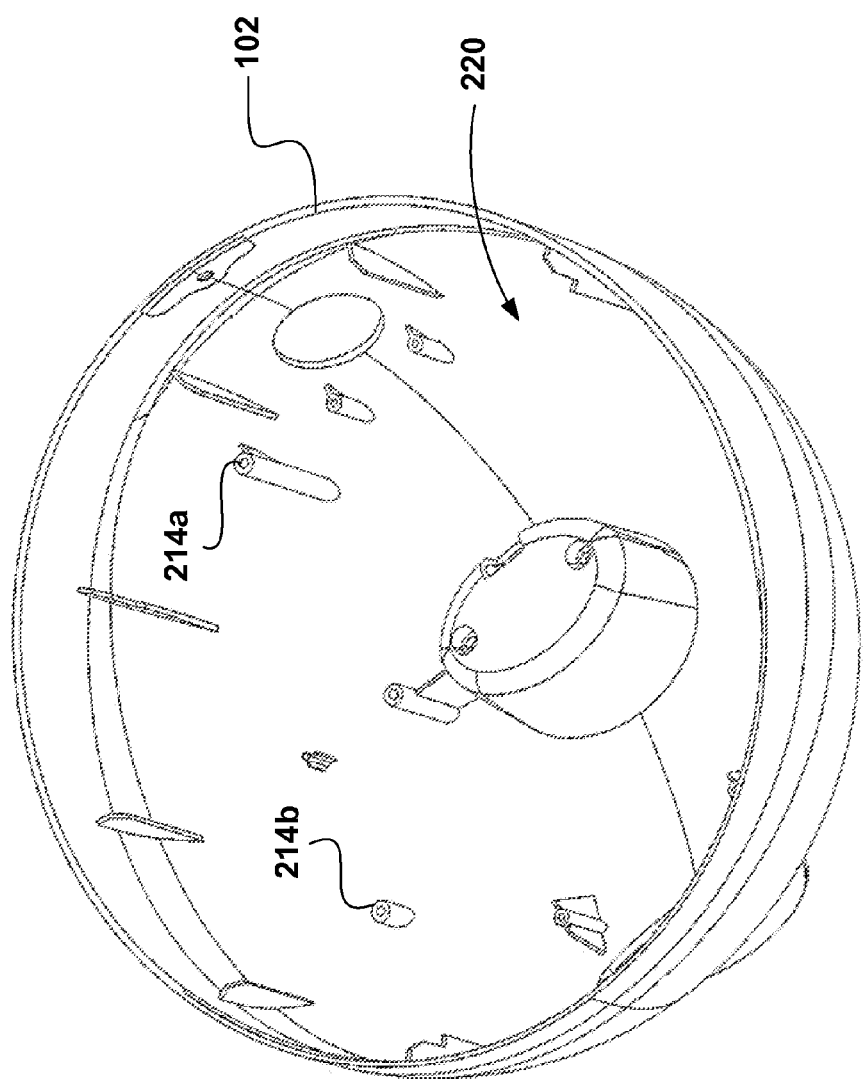
FIG. 8 illustrates a top, perspective view of an embodiment of a main body.

FIGS. 6 through 11 illustrates a conveyance path $C_p$, which may be defined, at least in part by a conveyance tube 202, including a conveyor, such as an auger 204, positioned therein for transporting the items stored in the tank 108 to a dispensing mouth 206 defined in the wall 138 of the main body 102. The conveyance tube 202 may be mounted within or at least partially within the main body 102 in an inner cover 208 as illustrated further in FIG. 7. For example, the inner cover 208 may include a conveyance tube recess 210 for accommodating the conveyance tube 202. The inner cover 208 may include one or more detents 212a, 212b, 212c, etc. (hereinafter detents 212) therein for aligning the inner cover 208 within the main body 102, which may include one or more protrusions 140 as noted above. While the detents 212 and corresponding protrusions 140 may generally exhibit a rectangular cross-section, other shapes are contemplated, such as half-circles or triangles. The inner cover 208 may mount on one or more bosses 214a, 214b (hereinafter bosses 214) provided in the main body 102, an example of which are illustrated in FIG. 8. Referring again to FIG. 7, the inner cover 208 may, in some non-exclusive embodiments, translate in the main body 102, or may be displace-able in a vertical manner with respect to the main body 102. In addition, the inner cover 208 may be completely removed from the main body 102. The main body 102 and the inner cover 208 may be formed of a metal, metal alloy, glass, wood, plastic including thermoplastic such as polypropylene, acrylic, polyethylene, acrylonitrile-butadiene-styrene, etc. It may be appreciated that the main body 102 and the inner cover 208 may be formed of the same or different materials. It may also be appreciated that, while in some non-exclusive embodiments, the inner cover 208 may be removed to provide access into the interior portion 220 (see again FIG. 8) of the main body 102, a panel or door may be provided in the side of the main body 102 in addition to, or instead of the inner cover 208. Furthermore, where the interior portion 220 of the main body may be accessed by a door or panel, the inner cover 208 may be integrated into the main body 102 so as to form a unitary piece.

Figure 9:
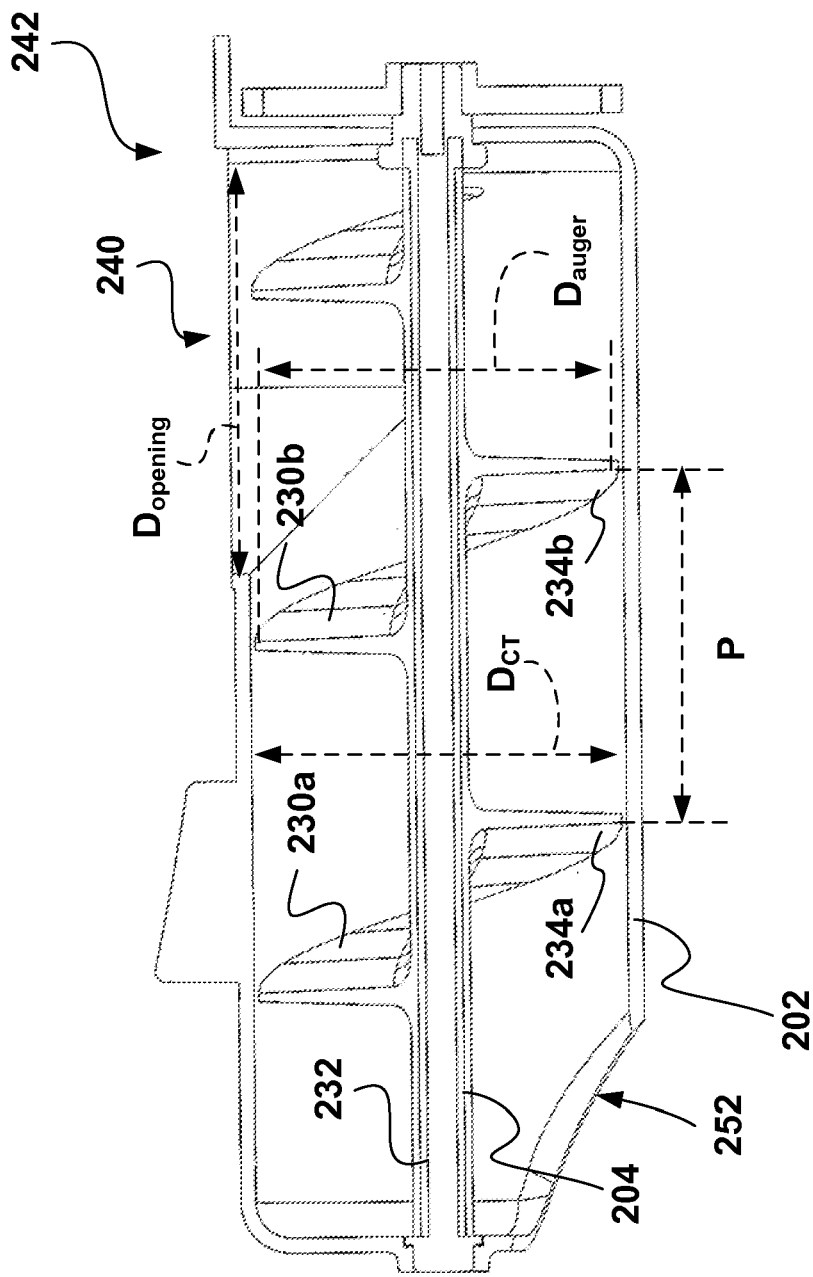
FIG. 9 illustrates a side, cross-sectional view of an embodiment of a conveyance tube with an auger therein.

As illustrated in FIG. 9, the auger 204 positioned within the conveyance tube 202 may include threads 230a, 230b, etc., (hereinafter threads 230) and a shaft 232. The auger 204 may be sized such that the overall diameter of the auger ($D_{auger}$), including the threads extending from in the inner shaft 232, may be equal to or less than the inner diameter of the conveyance tube ($D_{CT}$). For example, the diameter of the auger ($D_{auger}$) may be less than the diameter of the conveyance tube ($D_{CT}$). Accordingly, in one embodiment the relationship between the inner diameter of the conveyance tube ($D_{CT}$) and the overall diameter of the auger ($D_{auger}$) may be expressed as $0.1*(D_{CT}) \leq (D_{auger}) \leq 1.0*(D_{CT})$. In other examples, the diameter of the auger 204 may be greater than the diameter of the conveyance tube 202, which may cause the auger threads to bend or foldover scraping the sides of the conveyance tube 202. Further, in addition to the materials described above with reference to the main body 102 and/or the inner cover 208, the auger threads 230 may be composed of a thermoplastic elastomer or a natural or synthetic rubber. The auger shaft 232 may be formed of the same material or a different material than the auger threads 230, including those materials described above with reference to the main body 102 and/or the inner cover 208.

The auger pitch (P), which may be understood for example as the distance between the leading edge 234a, 234b of two consecutive auger threads 230, may be smaller than or equal to the overall diameter of the auger ($D_{auger}$). For example, the pitch (P) may be one half of the auger diameter ($D_{auger}$) to three times the auger diameter ($D_{auger}$), including all values and increments therein. Accordingly, in one embodiment the relationship between the overall diameter of the auger 204 to the distance between the leading edge 234a, 234b of two consecutive auger threads 230 may be expressed as $0.5*(D_{auger}) \leq (P) \leq 3.0*(D_{auger})$.

Figure 10:
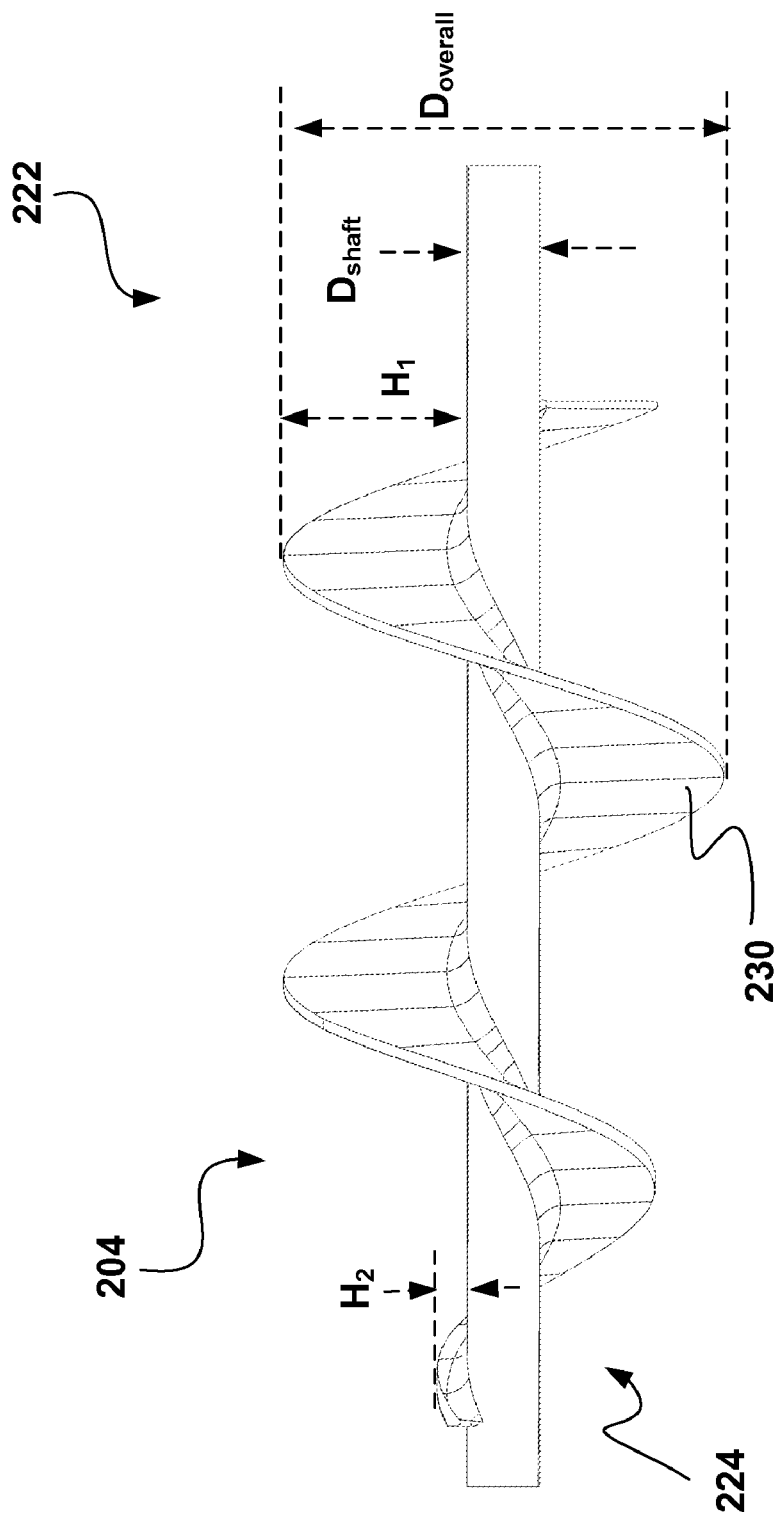
FIG. 10 illustrates a side view of an embodiment of an auger.

In some embodiments, the threads 230 may taper as illustrated in FIG. 10, which is a side view of the auger 204. For example, the threads 230 may have a relatively larger height ($H_1$) proximal to a first end of the auger 222 and a relatively smaller height ($H_2$) proximal to a second end of the auger 224. In addition, the first end of the auger 222 may be positioned proximal to the funnel opening 156 and the send end of the auger 224 may be positioned proximal to the dispensing mouth 206, or vice versa. In some embodiments, the ratio of the transition in height along the length of the screw from $H_1$ to $H_2$ may be in the range of 1:1 to 10:1, including all values and increments therein. Thus, it may be appreciated that $H1 \geq H2 \geq 0.1*H1$, including all values and increments therein. Furthermore, it may be appreciated that in some embodiments, the shaft diameter ($D_{shaft}$) may be adjusted, such that the diameter ($D_{shaft}$) of the shaft 232 is varied along the length of the shaft.

The conveyance tube 202 may include a first opening 240 at a first end 242 for receiving items from the tank 108, wherein the opening of the conveyance tube 202 may be positioned underneath the opening 156 defined in the bottom portion of the funnel 110. The first opening 240 of the conveyance tube 202 may have a cross-sectional length or diameter ($D_{opening}$) that is the same size or greater than a cross-sectional length (as measured in a similar direction of that of the first opening of the conveyance tube 240) or diameter of the opening 156 defined by the bottom of the funnel 108. In addition, the first opening 240 of the conveyance tube 202 may exhibit a diameter or a cross-sectional length in a direction parallel to and/or perpendicular to the shaft 232 of the auger 204 that may be equal to or greater than the overall diameter of the auger ($D_{auger}$).

Figure 6:
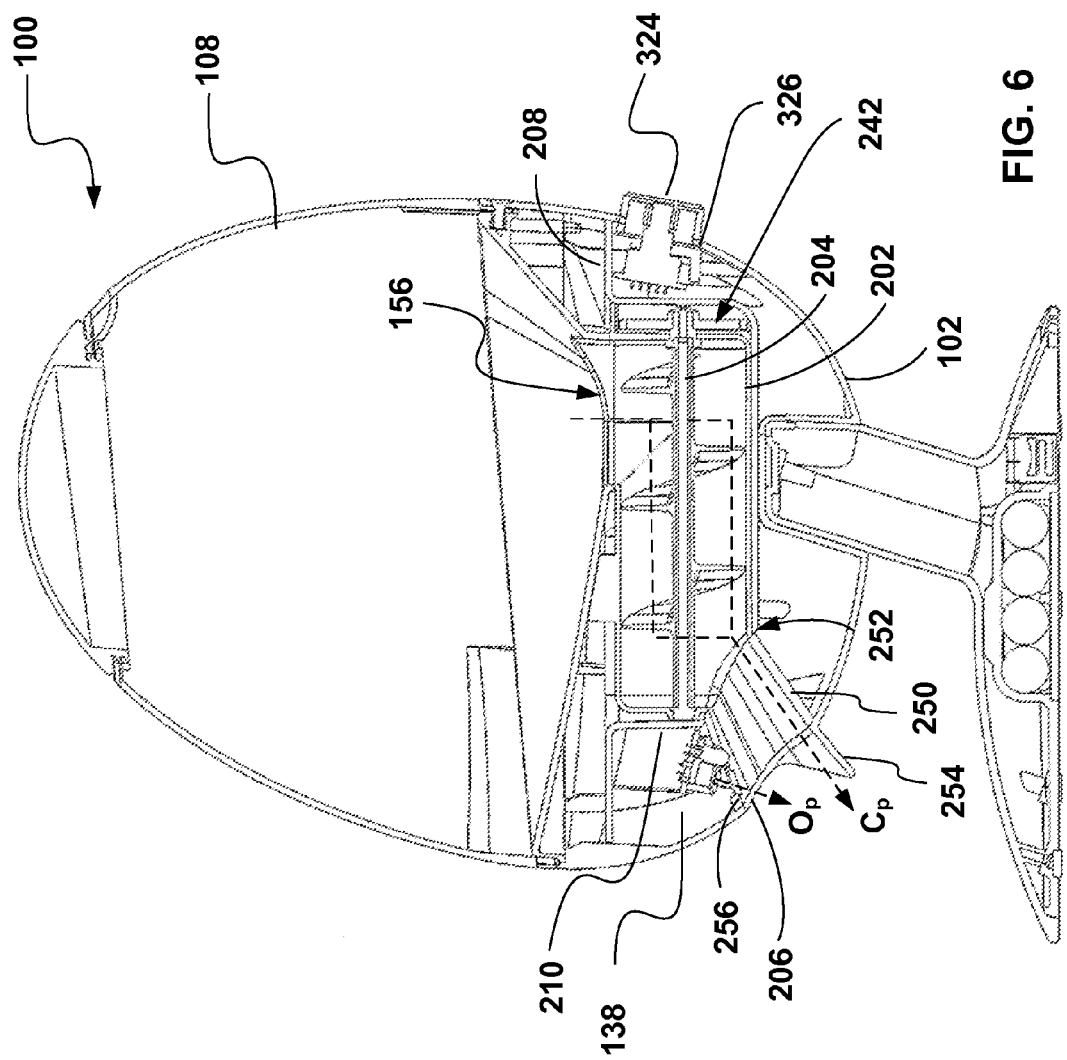
FIG. 6 illustrates a side cross-sectional view of an embodiment of a dispensing device.
Figure 7:
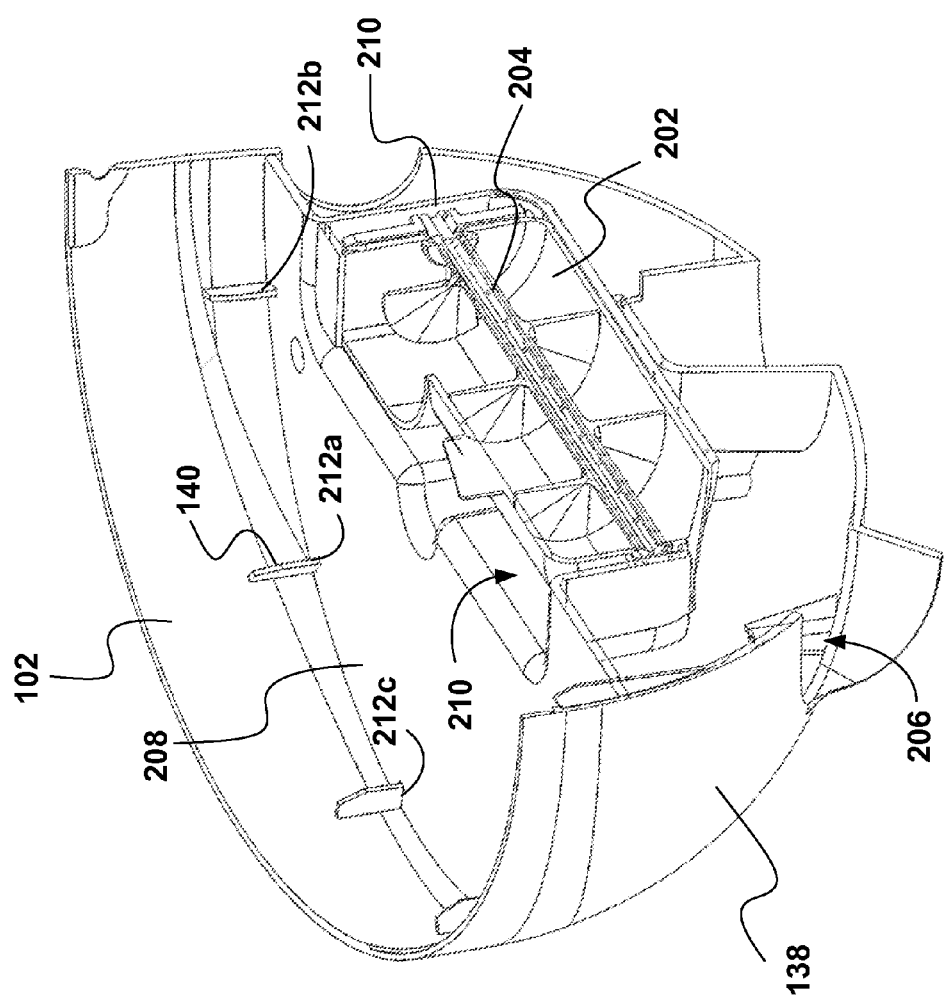
FIG. 7 illustrates a cross-sectional perspective view of an embodiment of a main body, inner cover and conveyance tube with an auger positioned therein.
Figure 11:
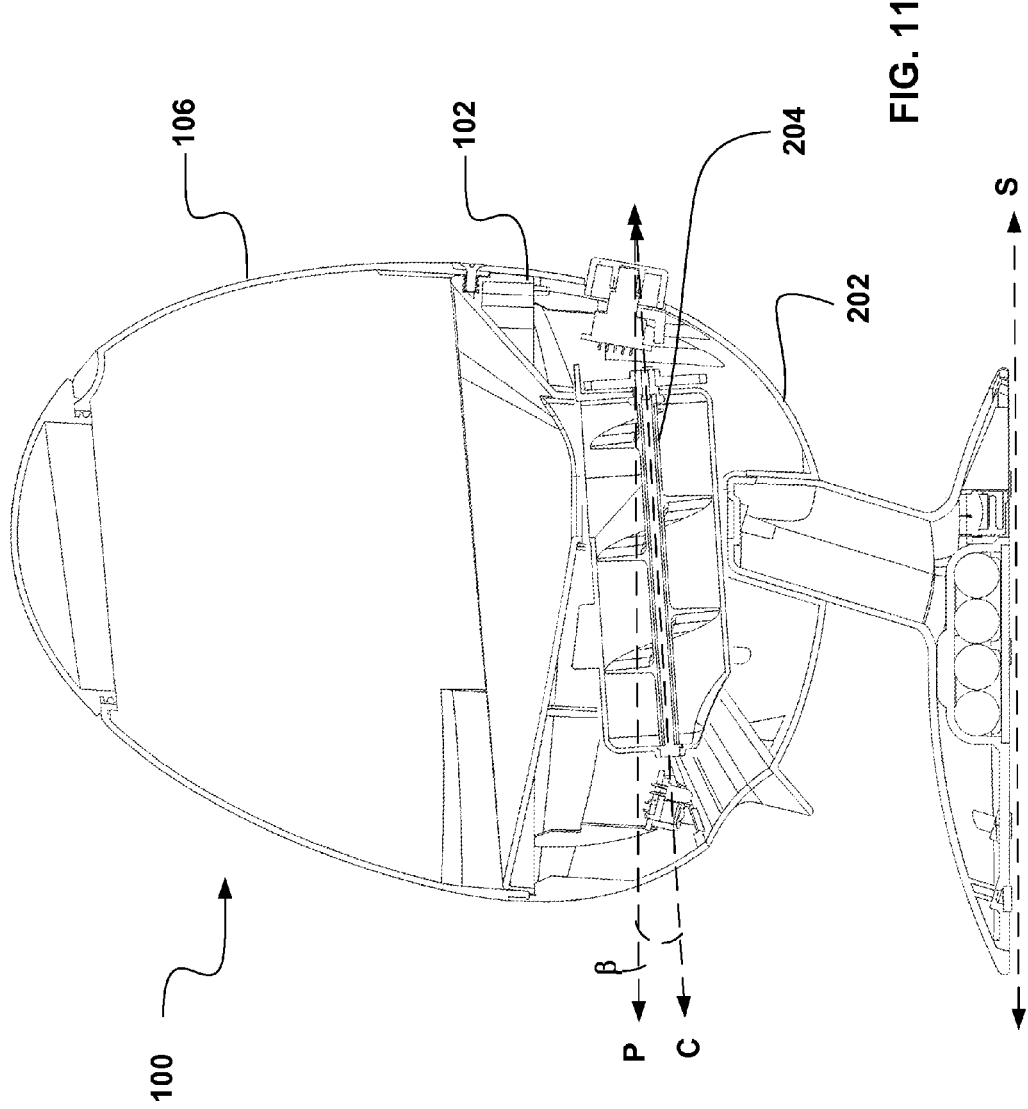
FIG. 11 illustrates a side cross-sectional view of an embodiment of a dispensing device.

While the conveyance tube 202 is illustrated in the embodiment of FIG. 6 as being generally horizontal to a surface S upon which the device 100 may rest, it may be appreciated that the conveyance tube 202 may be angled. FIG. 11 illustrates the conveyance tube 202 therein mounted in the main body 102 at an angle β, wherein angle β may be defined, for example, by the centerline C of the conveyance tube 202 relative to a horizontal plane P, such as, for example, a plane parallel or substantially parallel to the surface S upon which the device may 100 rest. Angle β may be in the range of −20 degrees to 70 degrees, including all values and increments therein Referring again to FIG. 6, an internal ramp 250 may extend from the second end 252 of the conveyance tube 202 to the dispensing mouth 206 defined by the main body 102, which may also define a portion of the conveyance path $C_p$. In some non-exclusive embodiments, the internal ramp 250 may be integrated or attached, either chemically or mechanically, to the conveyance tube 202, the main body 102 and/or the inner cover 208. In addition, the main body 102 may include a lip 254 that may direct dispensed items away from the dispenser 100 and into a receptacle. The internal ramp 250 may include an internal ramp cover 256. The internal ramp cover 256 may, in some non-exclusive embodiments, be integrated or affixed to the internal cover 208 or to the internal ramp 250.

Figure 12:
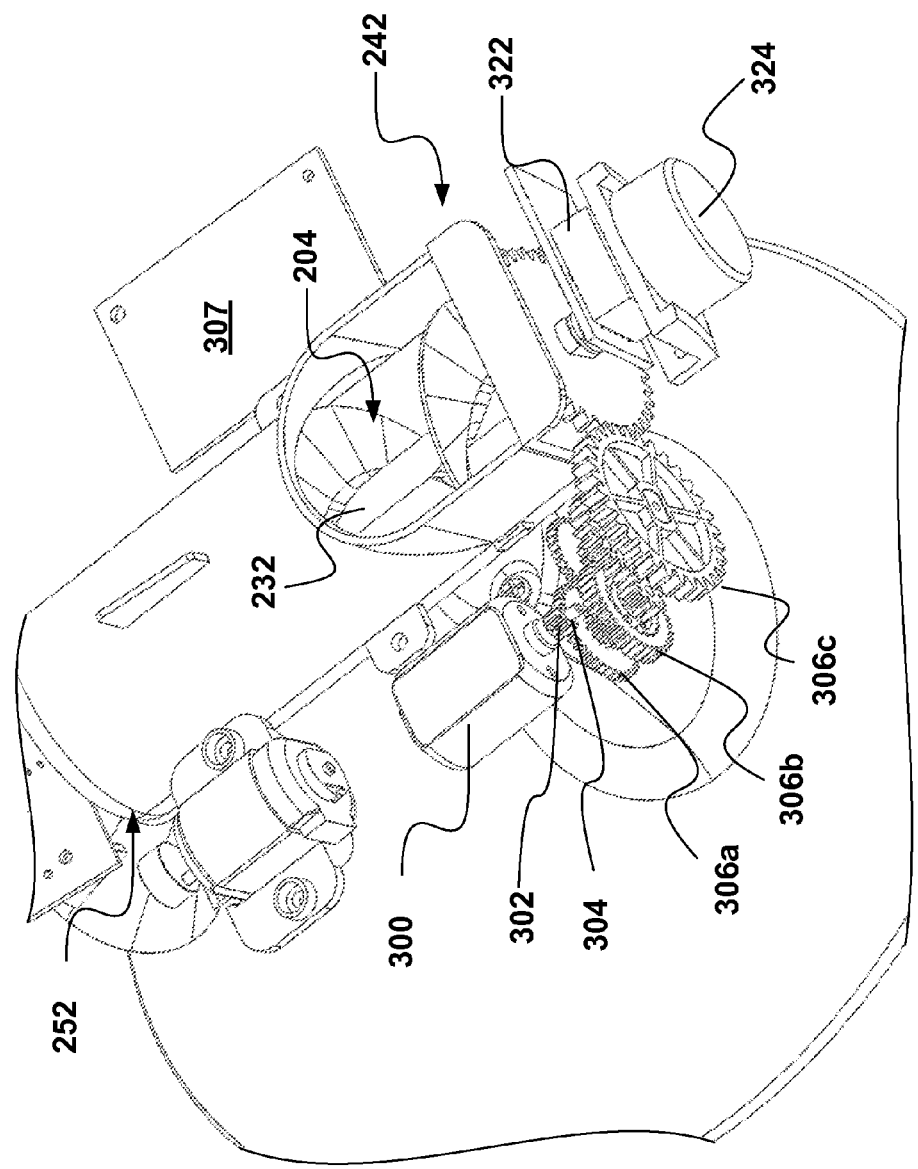
FIG. 12 illustrates a back/top perspective view of an embodiment of a conveyance tube, a drive motor mechanically coupled to the auger positioned within the conveyance tube, and a variable resistor with a dial.

In some non-exclusive embodiments, as illustrated in FIG. 12, a drive motor 300 may be mechanically or electrically (i.e., magnetically) coupled to the auger shaft 232. For example, a drive motor 300 may be mechanically coupled to the auger shaft 232 via one or more gears. In the embodiment illustrated herein, the drive motor 300 may include a first gear 302 affixed to or integrated with a driven shaft 304. Additional gears 306a, 306b, 306c, etc. (hereinafter referred to gears 306) may also be provided, which may multiply or reduce torque to the auger shaft 232.

Figure 13:
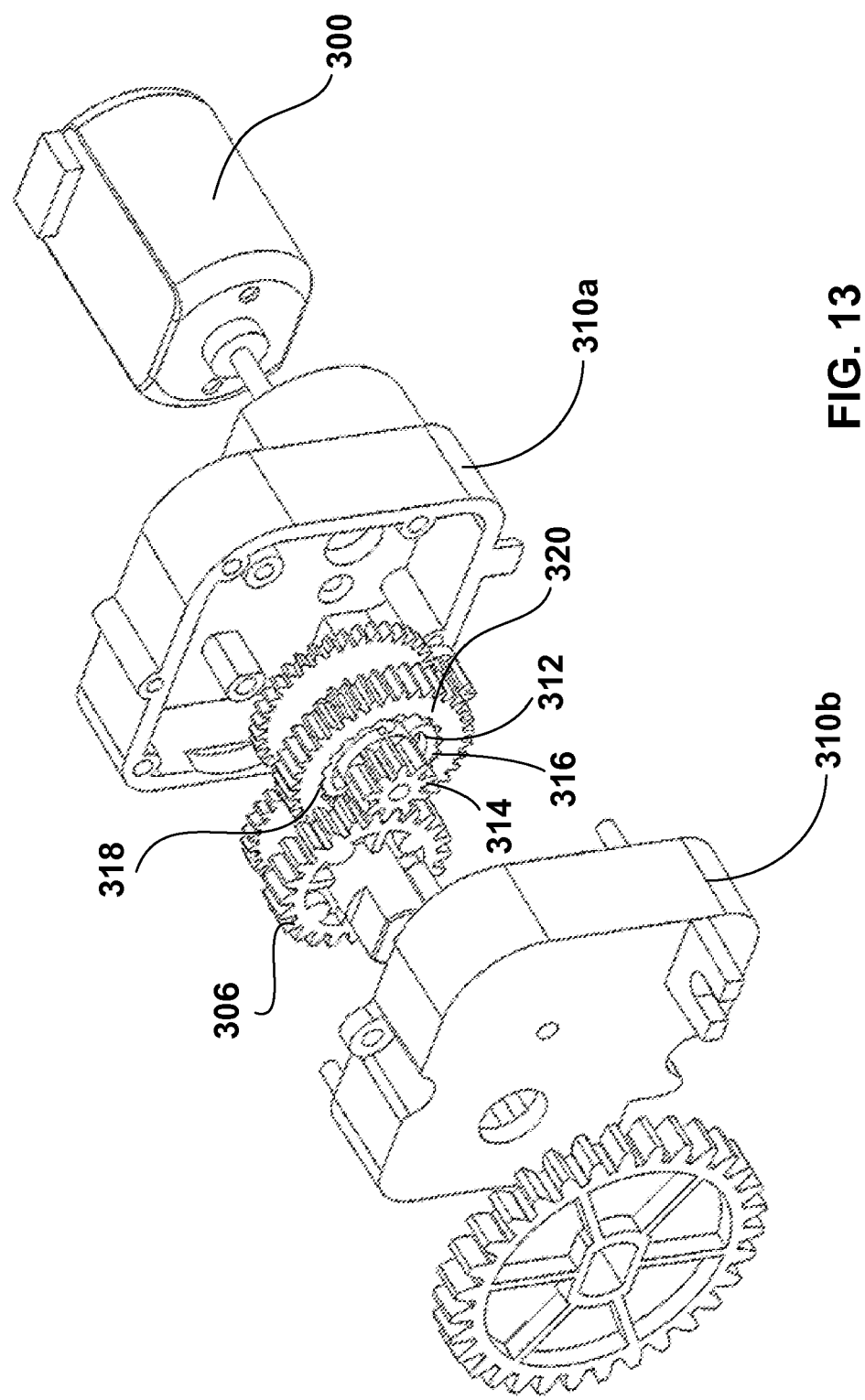
FIG. 13 illustrates an exploded perspective view of an embodiment of a gear and clutch assembly.
Figure 14:
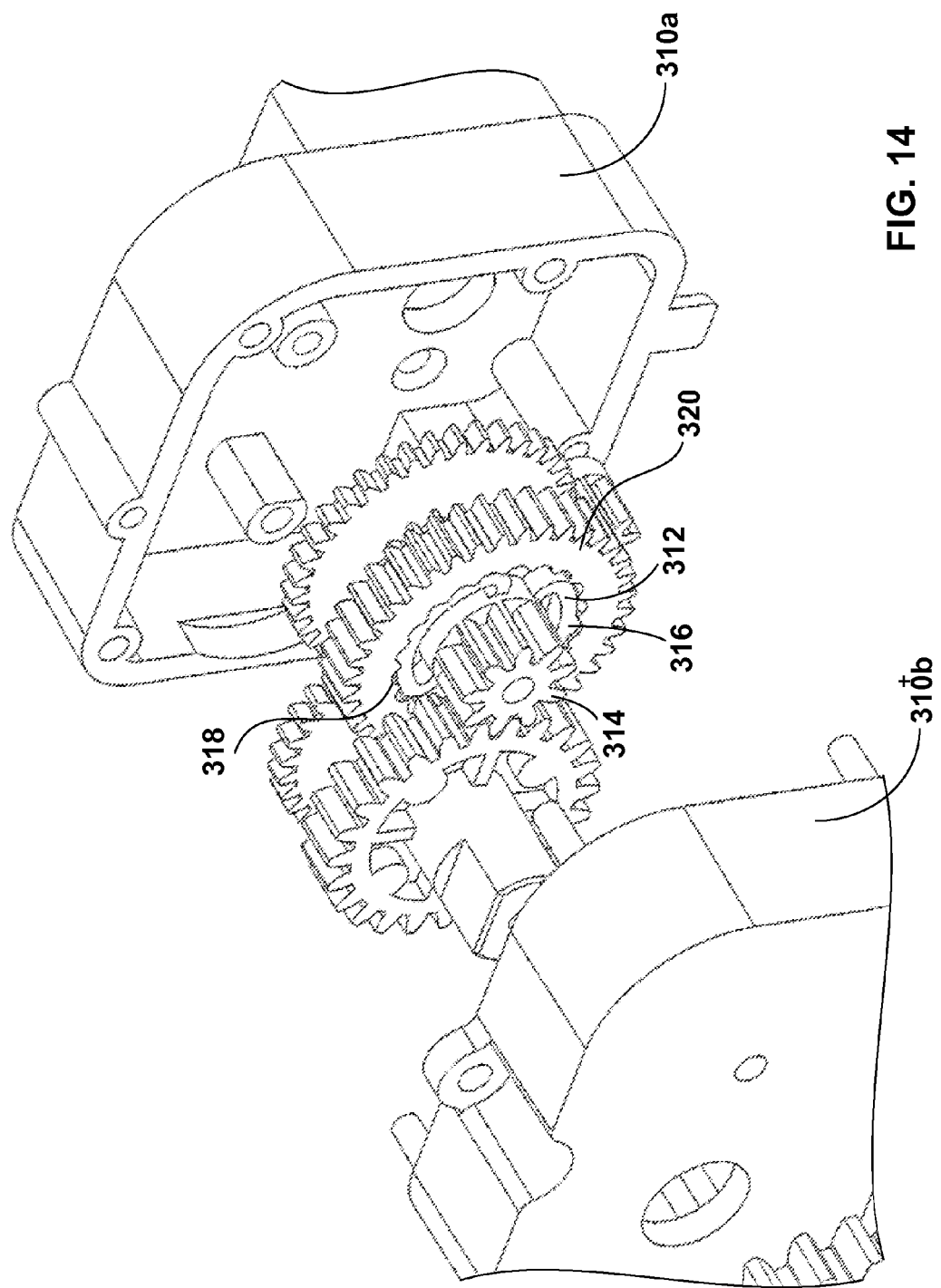
FIG. 14 illustrates a close up view of the gear and clutch assembly of FIG. 13.

In some embodiments, as illustrated in FIGS. 13 through 14, a clutch 312 may be provided to protect the gears 306 and motor 300 in the case of a jam in the conveyance path ($C_p$) (see FIG. 6). The clutch 312 may be affixed or integrated into to spur gear 314. The clutch 312 may include a number of relatively flexible external lobes 316 which interact with internal lobes 318 of an intermeshing gear 320. The external lobes 316 may ratchet or the clutch 312 may flex allowing the internal lobes 318 to pass over the internal lobes 316 should the drive motor 300 continue to spin if an auger jam occurs. As may be appreciated more than one clutch with a corresponding intermeshing gear may be provided.

Figure 15:
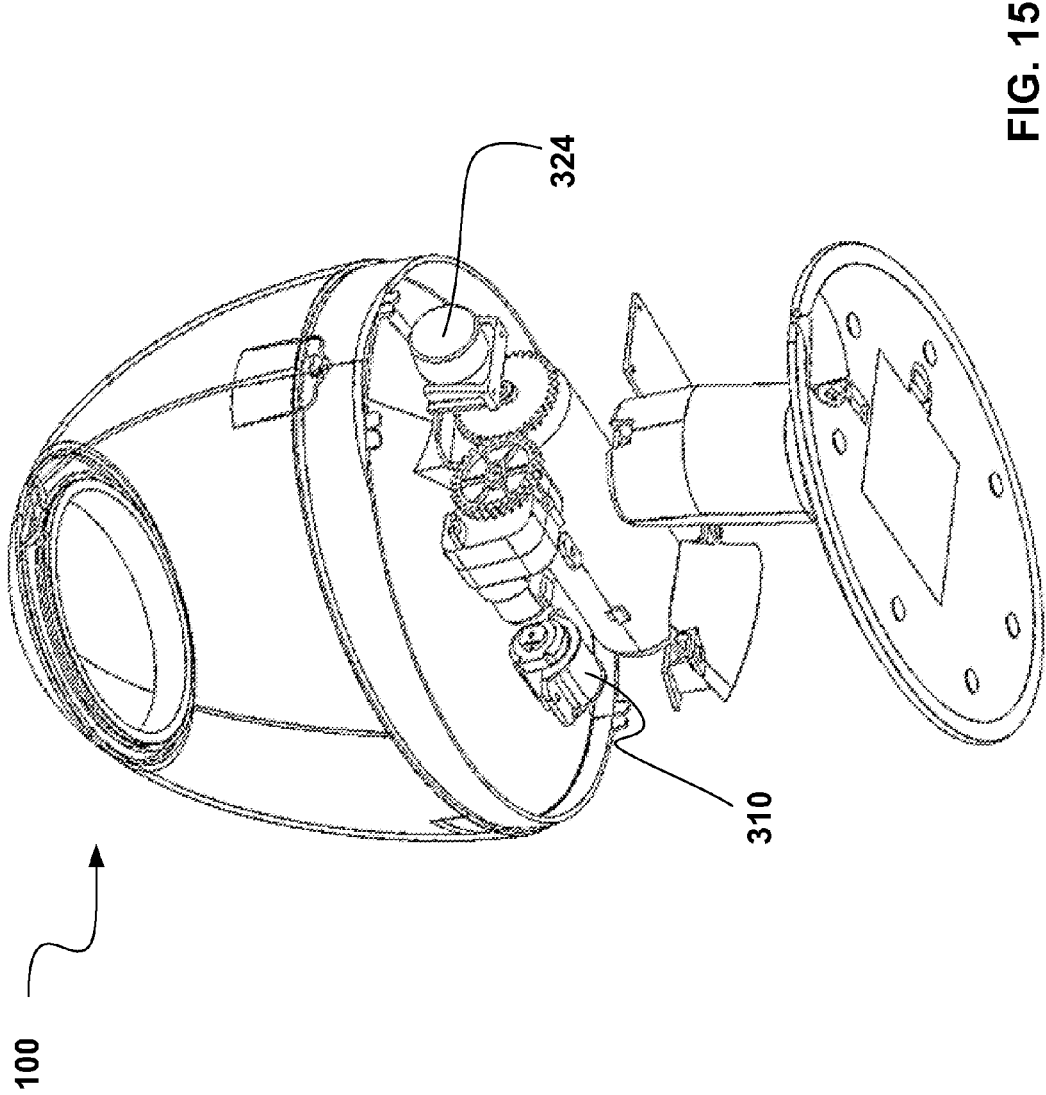
FIG. 15 illustrates a bottom perspective view of an embodiment of the dispensing device with the main body removed from the figure illustrating the drive motor gear box.

Referring to FIG. 13 and FIG. 15, a gear housing 310 may be provided to protect the gears 306 from contacting other objects that may become loose in the main body. The gear housing may be provided in multiple parts such as halves 310a and 310b, which may be affixed together. It may be appreciated that more than two parts of the housing may be provided and that the parting line of the parts may alternate in plane. As the auger 204 rotates, items stored in the tank 108, as illustrated in FIG. 6, may fall into the conveyance tube 202 and may be conveyed by the auger 204 from the first end 242 to the second end 252 of the conveyance tube 202, dropping down the internal ramp 250 and out the dispensing mouth 206.

Referring back to FIG. 12, the speed of the drive motor 300, and therefore the auger 204, may be adjusted by circuitry 307, which may include singly or in any combination, hardwired circuitry, programmable circuitry, state machine circuitry, and/or firmware that stores instructions executed by programmable circuitry. In some example, the circuitry may include a variable resister 322 such as a potentiometer, rotary switch, adjustable voltage divider, etc. The variable resistor 322 may allow, not only for the control of the speed of the drive motor 300 or the duration for which the drive motor 300 operates, but may also be used to turn the dispensing device 100 on or off. However, it may be appreciated that in some examples, a separate power switch may also be provided in addition to, or instead of the variable resistor 322. The variable resistor 322 may be electrically coupled to the drive motor 300 either directly or indirectly. In some non-exclusive embodiments, the variable resistor 322 may be electrically coupled to an application specific integrated circuit (ASIC) or a programmable printed circuit board, which in turn may be coupled to the drive motor 300. The variable resistor 322 may include a dial or switch 324. As illustrated in FIG. 6, the dial 324 may protrude through a dial opening 326 defined in the main body 102.

Figure 16:
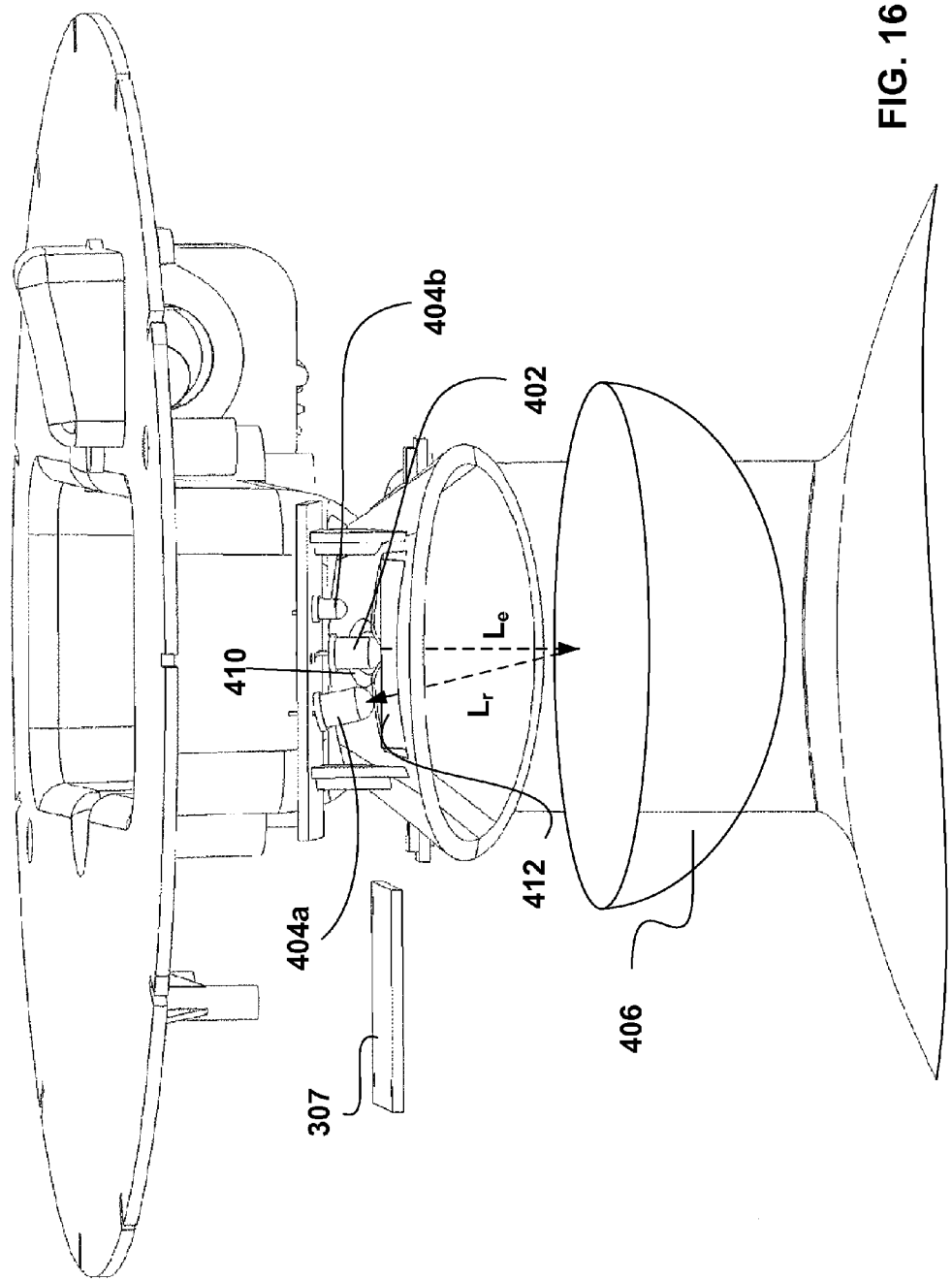
FIG. 16 illustrates a front view of an embodiment of the dispensing device with the storage portion, inner cover and main body removed, illustrating the sensor and a receptacle.
Figure 17:
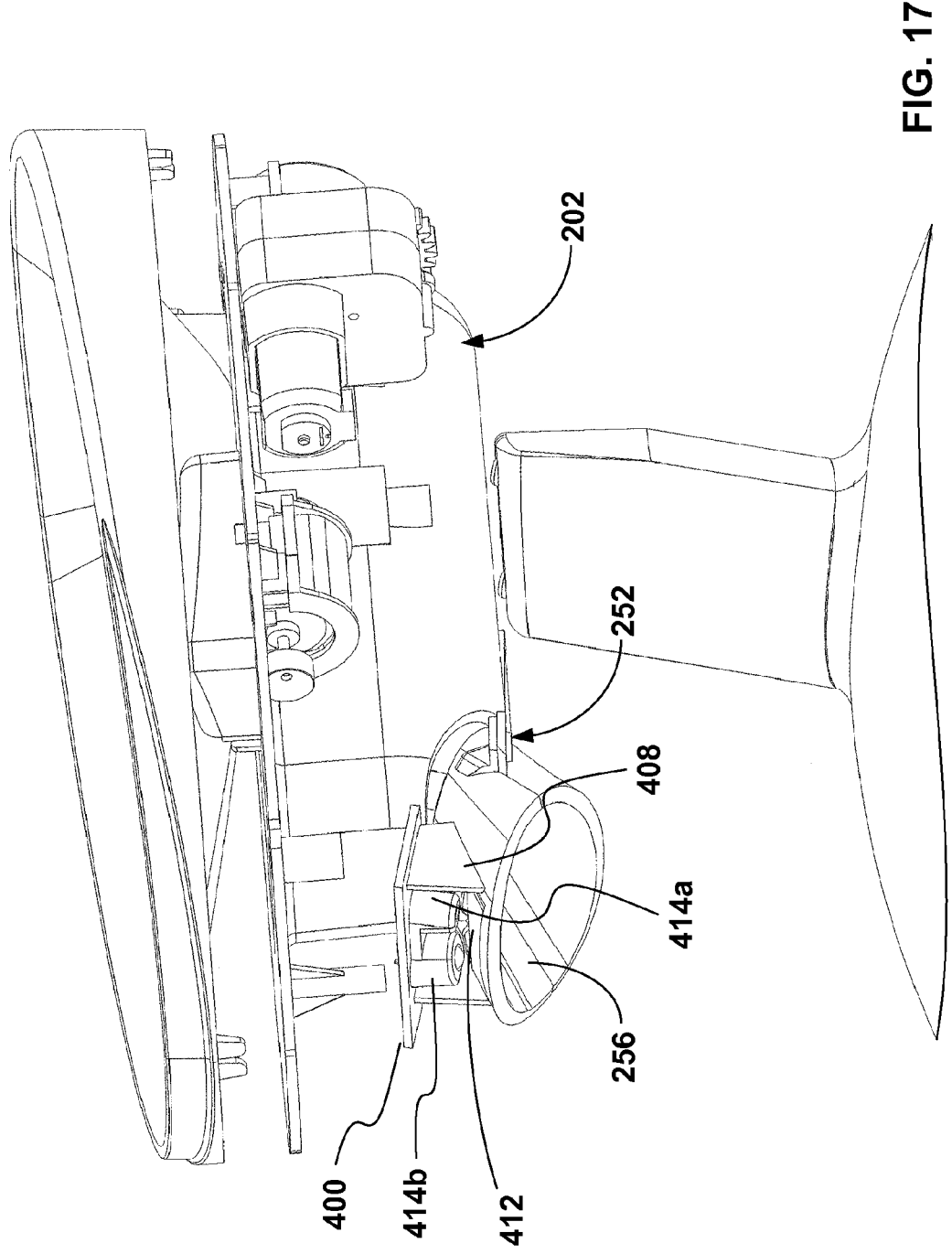
FIG. 17 illustrates a side perspective view of an embodiment of the dispensing device with the tank, lid and main body removed, illustrating the sensor.

As illustrated in FIGS. 16 through 17, a sensor 400 may be provided to operate the motor, e.g., turning the motor on and/or off. In some non-exclusive embodiments, the sensor 400 may be an optical sensor, such as an optical proximity sensor or an optical motion sensor. The optical sensor 400 may include a light transmitter 402 and a light detector 404a and 404b (hereinafter referred to detector 404). In some non-exclusive embodiments, an object 406 (such as a receptacle for receiving items stored in the tank 108) may cause at least a portion of light emitted ($L_e$) from the light transmitter to be reflected ($L_r$) towards the light detector 404, which may then detect the reflected light ($L_r$). The light emitter 402 and/or detector 404 may operate in the infrared, visible or UV range having an electromagnetic wavelength in the range of 240 nm to 1000 nm, including all values and increments therein, such as 240 nm to 380 nm, 380 nm to 500 nm, 500 nm to 750 nm, etc.

The sensor 400 may be mounted on the dispensing device 100 in a number of locations. In addition, if positioned on the interior portion of the dispensing device 100, such as in the interior portion 220 of the main body 102 or tank 108, the dispensing device 100 may include a number of openings or windows providing an optical path between the sensor and the exterior of the dispensing device 100. Optical communication may be understood herein as the ability of light or at least a portion thereof, including light within the operating wavelengths of the sensor, to travel, such as through a given medium, including air or a material. Optical communication may occur by an optical path.

In one embodiment, illustrated in FIG. 17, the sensor 400 may be mounted on the internal cover 256 by a lampstand 408. In some non-exclusive embodiments, the sensor 400 may be positioned near the second end 252 of the conveyance tube 202 and/or between the conveyance tube 202 and the main body 102. Furthermore, the sensor 400 may be positioned near the dispensing mouth 206 (see FIG. 6) so that the sensor 400 may detect whether a receptacle for receiving items dispensed from the dispensing device 100 is present near the dispensing mouth 206. As may be appreciated, other objects may also be detected by the sensor 400 and detection may not be limited to just hands, dishes or other containers. Furthermore, as may be appreciated proximity to dispensing mouth may be understood any distance from the dispensing mouth which an object may be detected by the sensor and may be varied depending on the sensor or sensor settings. For example, proximity to the dispensing mouth may include an area within the internal ramp 250 or within 8 inches from the dispensing mouth, including all values and increments therein, such as 1 inch, 2 inches, 4 inches, etc. It may also be appreciated that the area surrounding and/or, immediate to the dispensing device, may be understood herein as the "environment". The environment may also include the optical path and/or anything in proximity to the sensors.

As the sensor 400, in some non-exclusive embodiments may be positioned above the internal ramp cover 256, one or more openings 410 may be provided in the internal ramp cover 256 to allow light emitted ($L_e$) by the sensor 400 to pass through the dispensing mouth 206 defining an optical path ($O_p$) (illustrated in FIG. 6). A sensor cover 412 may be provided in the internal ramp cover 256, which may protect portions of the sensor 400 from damage due to physical contact by either the dispensed items or the receptacle in which the items may be received, yet still allow light, particularly light in the electromagnetic range at which the sensor operates, to pass through forming, in some non-exclusive embodiments a portion of the optical path ($O_p$).

It may be appreciated that in other non-exclusive embodiments, the sensor 400 may be mounted on the main body 102, such as underneath the dispensing mouth 206, depending on the geometry of the main body 102. In such an embodiment, openings may be defined in the main body 102, providing an optical path between the sensor 400 and the exterior of the main body 102.

In addition, in some non-exclusive embodiments, such as illustrated in FIG. 17, the lampstand 408 may include sleeves 414a, 414b that may block light from external sources that are not emitted by the sensor or light directly emitted by the sensor but not otherwise reflected to trigger the sensor 400. It may be appreciated that triggering the sensor 400, may be understood herein as an event or occurrence that may cause the sensor 400 to provide an output to the circuitry 307. It may be appreciated that the lampstand 408 may position the sensor components at appropriate angles relative to the dispensing mouth 206 to form a desired optical path $O_p$.

The sensor 400 may be electrically coupled to the drive motor 300 either directly or indirectly. In some non-exclusive embodiments, the sensor 400 may be electrically coupled to circuitry 307, which may itself be electrically coupled to the drive motor 300 to control the operation of the drive motor 300 (illustrated in FIG. 12) based on the input from the sensor 400. As may be appreciated, power to the drive motor 300 may be provided via the circuitry 307 or the drive motor 300 may receive power from a separate power source. In further non-exclusive embodiments, the circuitry 307 may interrupt the power supply to the drive motor 300.

For example, circuitry 307 may receive an output from the sensor 400 indicating the presence of a receptacle, such as a user's hand, a dish or a bowl, for receiving items from the tank 108. The circuitry 307 receiving that signal may turn the motor 300 on for a specified period of time, i.e., a time period. The drive motor 300 may rotate at a given speed, such as a speed selected with the variable resistor 322 or at a preset or fixed speed, dispensing items from the tank 108. After the expiration of the time period the drive motor 300 may stop rotating due to the circuitry 307 turning the drive motor 300 off. As may be appreciated a time period variable resistor may be provided to adjust the time period in which the motor drive 300 runs. It may be appreciated that when the drive motor is activated, the vibratory motor, discussed further below, may be activated as well.

In a further embodiment, the circuitry 307 may trigger the drive motor 300 to run for a time period after receiving output from the sensor 400 that a receptacle is present. However, if the circuitry 307 receives additional outputs from the sensor 400 within a wait period after the drive motor 300 is triggered, the circuitry will ignore the additional outputs until the wait period has expired. As maybe appreciated, a wait period variable resistor may be provided to select the length of time the wait period is.

In further non-exclusive embodiments, for as long as a receptacle is present, the sensor 400 may send an output to the circuitry 307 indicating the presence of the receptacle. Upon receiving an output indicating the receptacle is present, the circuitry 307 may activate the motor. Upon removing the receptacle the sensor 400 may no longer provide an output to the circuitry 307 and the circuitry 307 may then turn off the drive motor 300.

A vibratory device 500 may also be provided, which may be used to prevent the items dispensed from the tank 108 (illustrated in FIG. 6) from jamming or failing to feed through the funnel 110 (illustrated in FIG. 6). In some embodiments, the vibratory device 500 may also prevent sticking or agglomerating of the items within the storage portion 106. For example, when chocolate coated candies may be placed in the storage tank, or gummies, the contact of the candies or gummies at elevated temperatures over a period of time may cause the items to fuse or stick together, preventing the items from feeding through the device. The vibratory device 500 may prevent these items from sticking.

Figure 18:
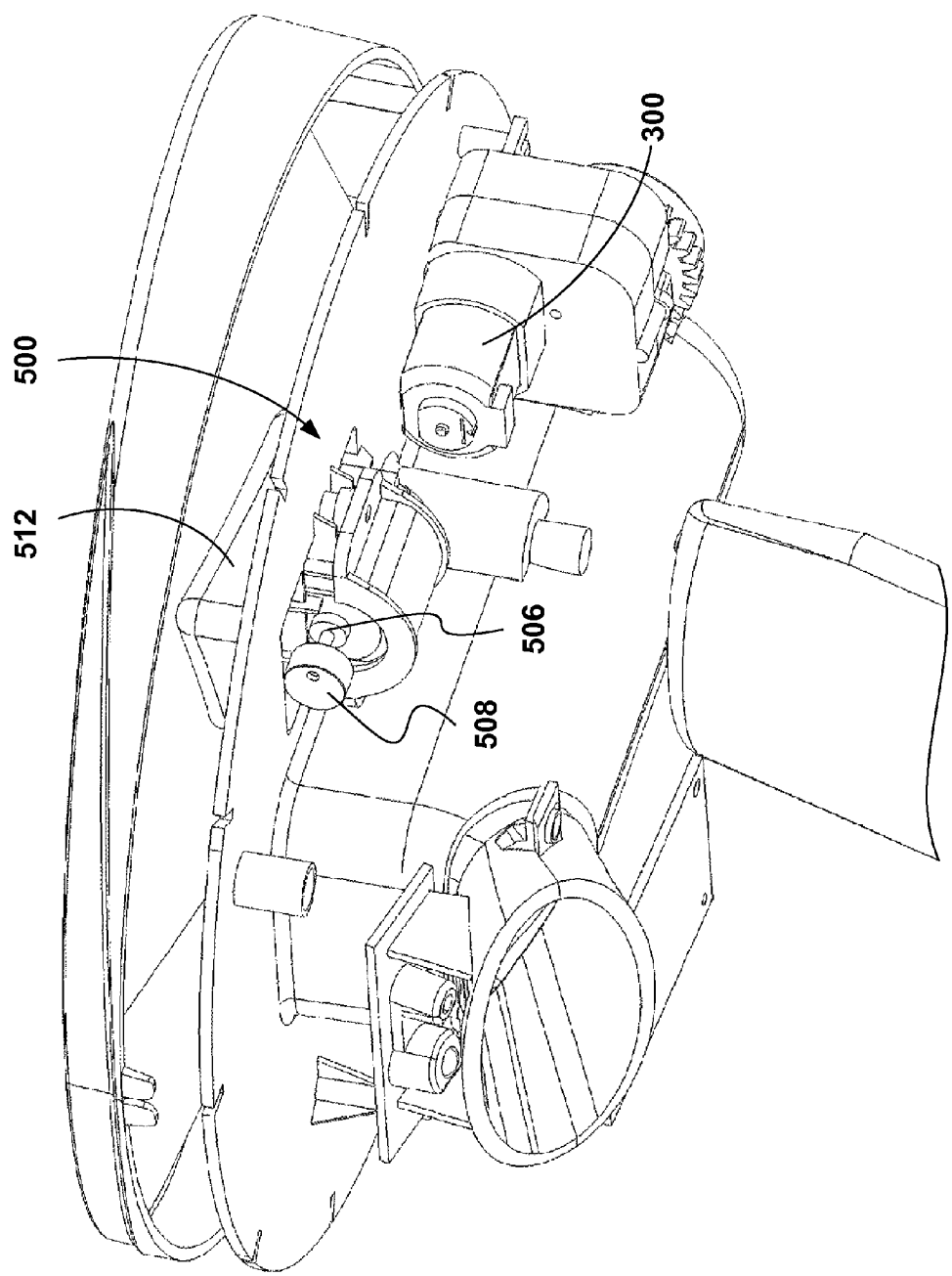
FIG. 18 illustrates a bottom perspective view of an embodiment of the dispensing device with the tank, lid and main body removed, illustrating the vibratory device.
Figure 19:
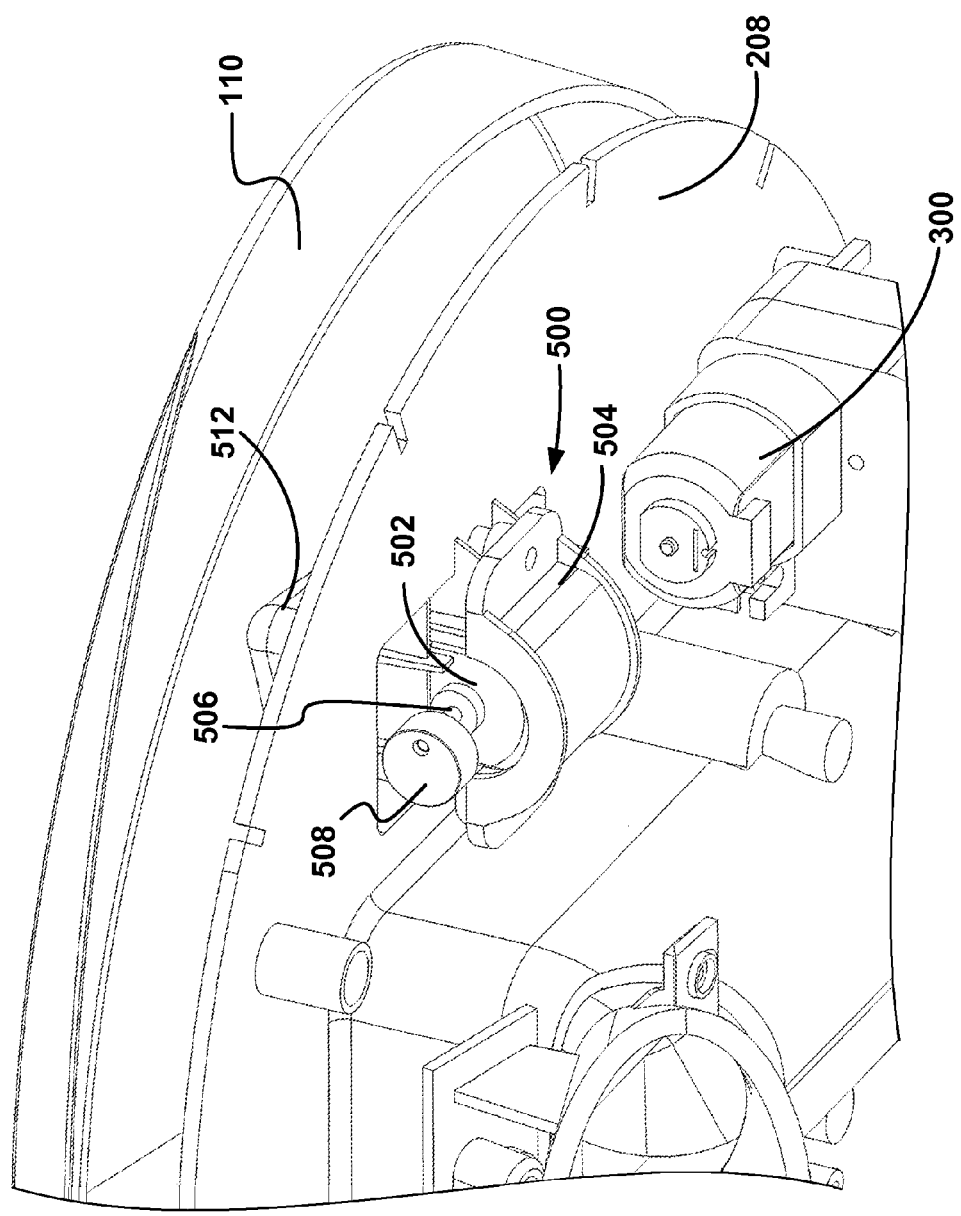
FIG. 19 illustrates a bottom perspective view of an embodiment of the dispensing device with the tank, lid and main body removed, illustrating the vibratory device.

The vibratory device 500 may mechanically contact directly or indirectly the main body 102, inner cover 208 and/or funnel 110 at a given frequency while the drive motor 300 is on. An embodiment of a vibratory device 500 is illustrated in FIGS. 18 and 19. The vibratory device 500 may include a vibratory motor 502 mounted in a motor cover 504. The motor cover 504 may be affixed, in some non-exclusive embodiments, to the inner cover 208 or to the main body 102. The vibratory device 500 may include a driven shaft 506 and an eccentric body 508 mounted to or integrated with the driven shaft 506 so that the eccentric body 508 may contact the inner cover 208 at given intervals, i.e., every rotation of the driven shaft 506, which may in turn contact the funnel 110. As noted above, the inner cover 208 may be displaceable relative to the main body 102 riding up and down on the protrusions 140 provided in the main body 102.

The repeated contact from the eccentric body 508 may cause vibration in the dispensing device 100, and particularly in the inner cover 208 and/or the funnel 110. The vibration may provide sufficient jarring motion to forcefully eject jammed items or overcome the force of static friction to move the items in the tank 108 down the funnel 110 towards the opening defined in the funnel 156 and into the conveyance tube 202 (see FIG. 6). As illustrated, in FIGS. 18 and 19, the inner cover 208 may include an alcove 512 to accommodate a portion of the vibratory device 500.

Figure 20:
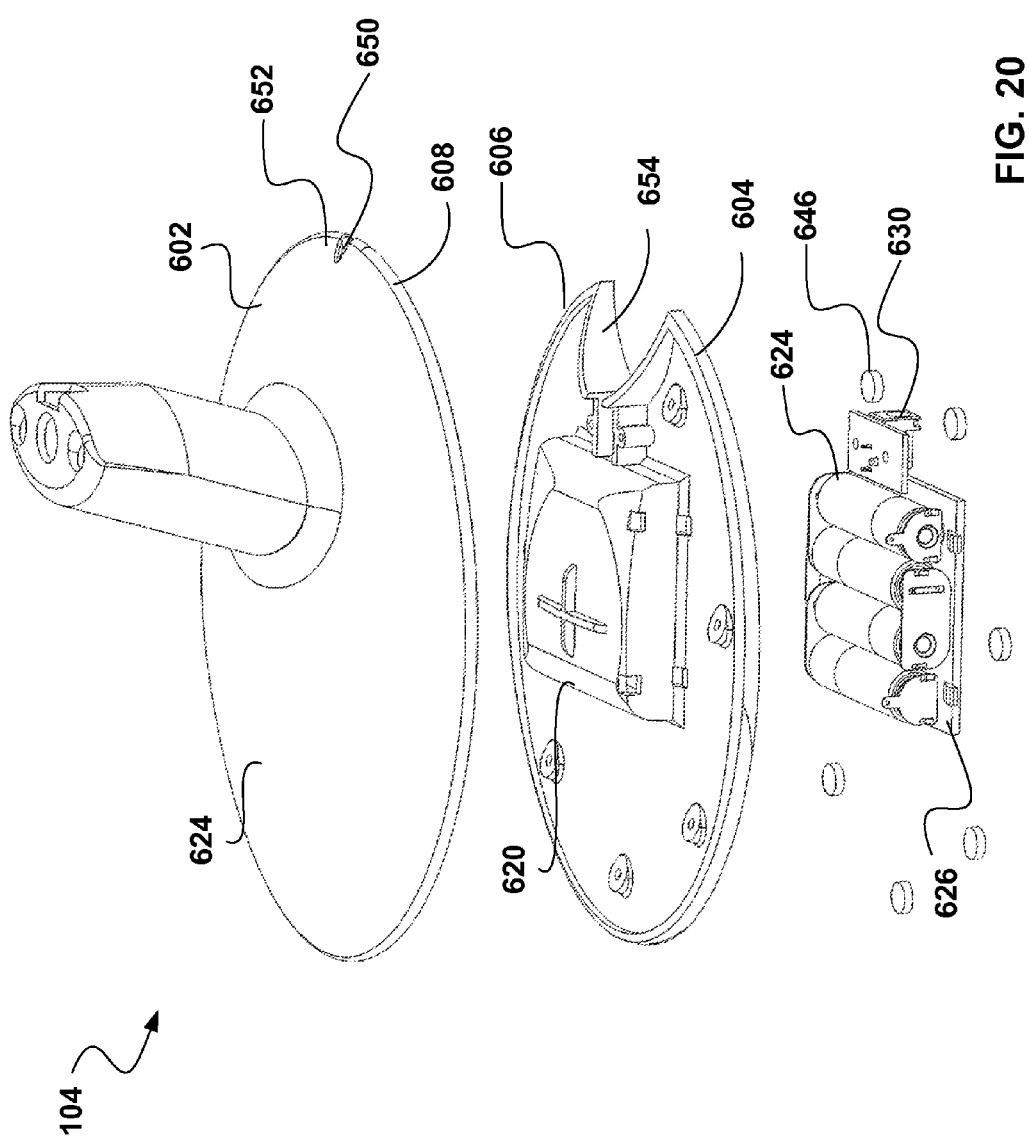
FIG. 20 illustrates an exploded side view of an embodiment of the stand.
Figure 21:
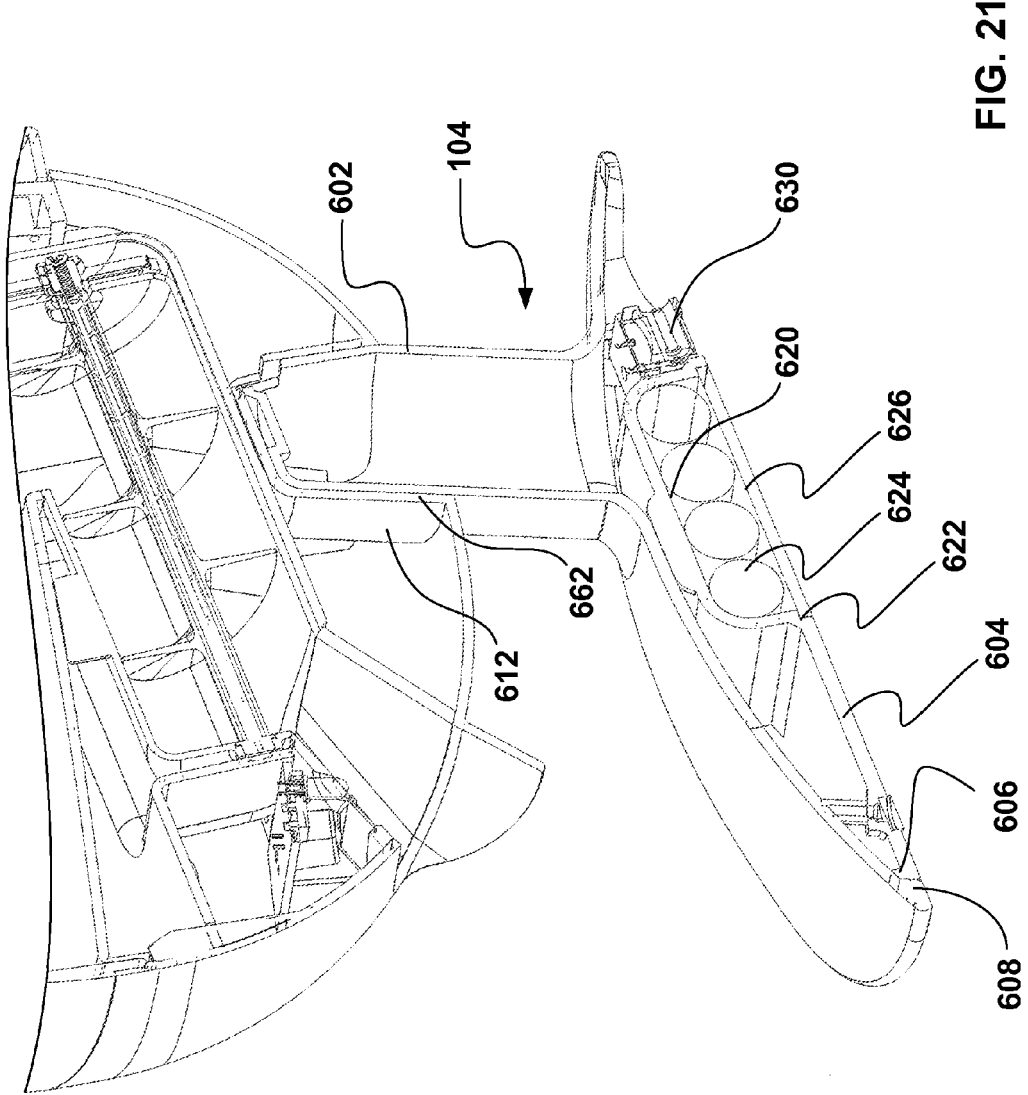
FIG. 21 illustrates a side perspective cross-sectional view of an embodiment of the dispensing device illustrating the main body and the stand.

As noted above, with respect to FIG. 1, the dispensing device 100 may also include a stand 104. An exploded view of an embodiment of the stand 104 is illustrated in FIG. 20. The stand 104 may include an upright portion 602 and a base 604. The upright portion 602 may be integrally formed with the base 604 or may be attached to the base in either a relatively permanent manner or a releasable manner. For example, the rim of the base 606 may frictionally fit within the bottom of the upright portion 608 as illustrated in FIG. 21. The stand may fit into a base alcove 612 defined in the main body 102. In some non-exclusive embodiments, the stand 104 may mechanically interlock with the main body 102 by frictional association with the main body 102 or via projections in the stand that may be received in recesses in the main body (or vice versa).

Figure 22:
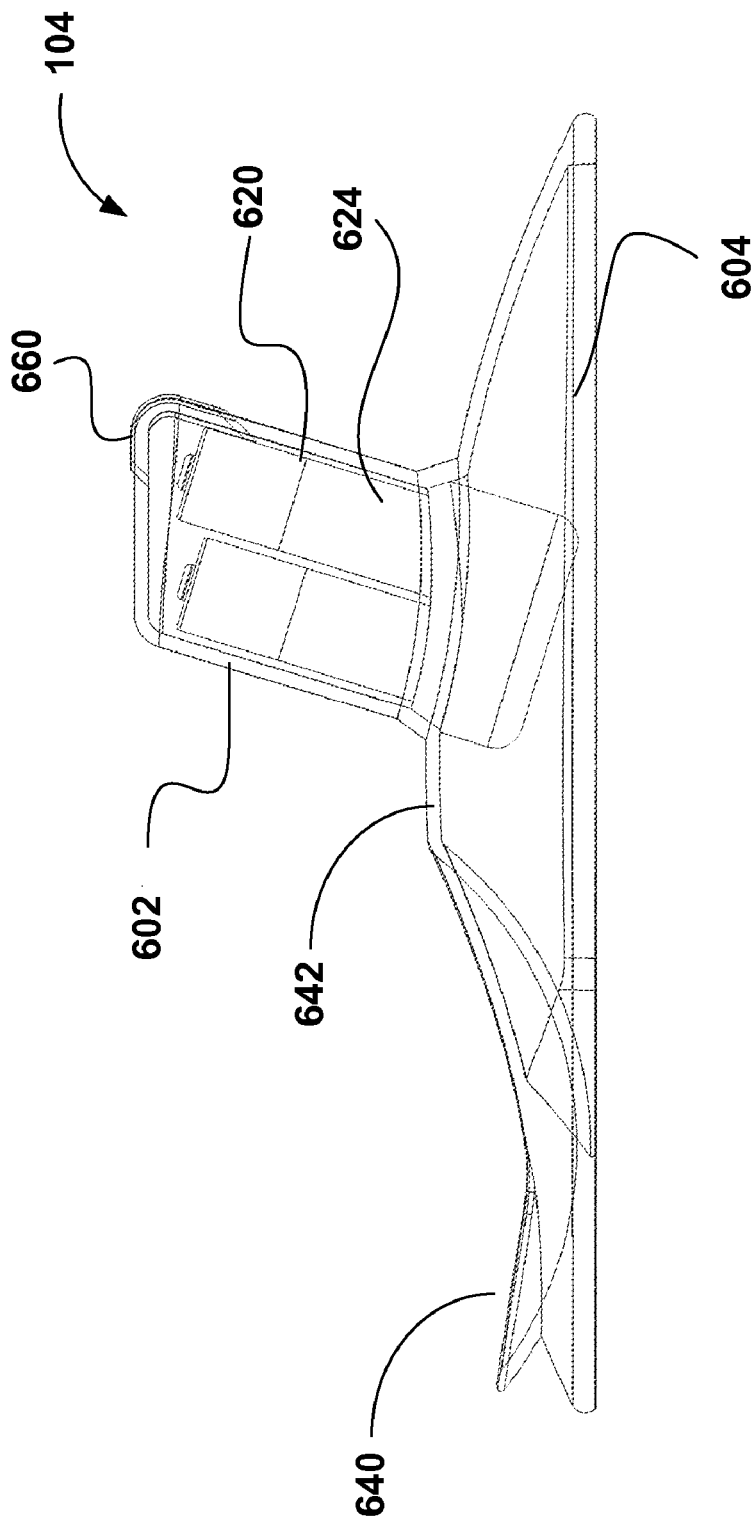
FIG. 22 illustrates a side view of an embodiment of the stand.
Figure 23:
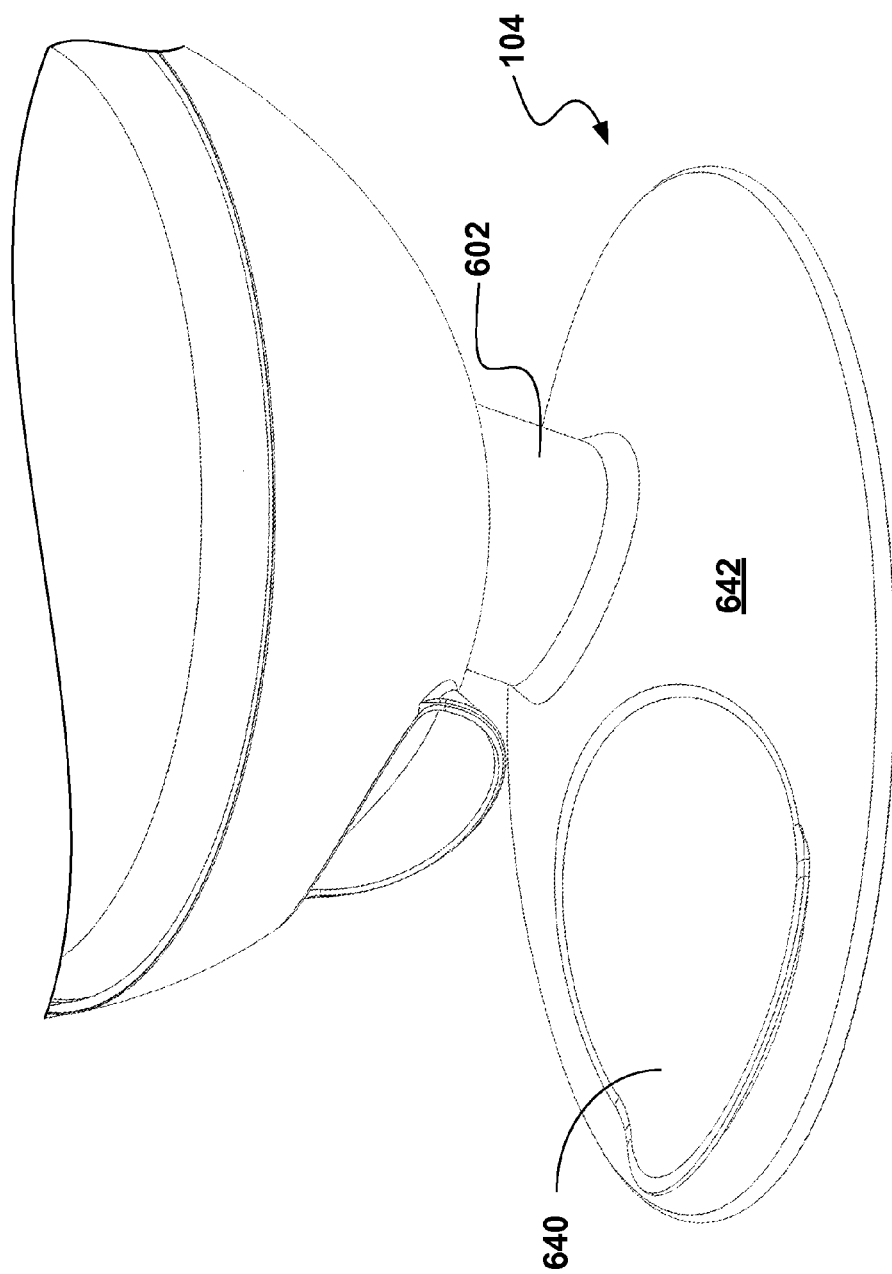
FIG. 23 illustrates a top perspective view of an embodiment of the stand.

A battery compartment 620 may be defined in the base 604 of the stand 104 having an opening 622 therein for receiving batteries 624 that may supply power to the drive motor and/or the vibration motor. A cover 626 may be provided over the opening 622 for enclosing the battery compartment 620. While the battery compartment 620 is illustrated as being provided in the base 604 of the stand 104, the battery compartment 620 may also be provided in the upright portion of the stand 602 as illustrated in FIG. 22. Referring back to FIG. 20, the dispensing device may also include a DC jack 630 or other power supply for receiving power from an external source such as a car battery, wall outlet or a USB port. As may be appreciated, while the DC jack 630 is illustrated as being positioned in the base 604 of the stand 104, the DC jack (or other power supply) may be provided in the upright portion 602 of the stand 104 or in the main body 102. It may be appreciated that in some non-exclusive embodiments, as illustrated in FIG. 23, the stand 104 may also include a depression or catch basin 640 formed on or in the upper face 642 of the upright portion 602.

Figure 24:
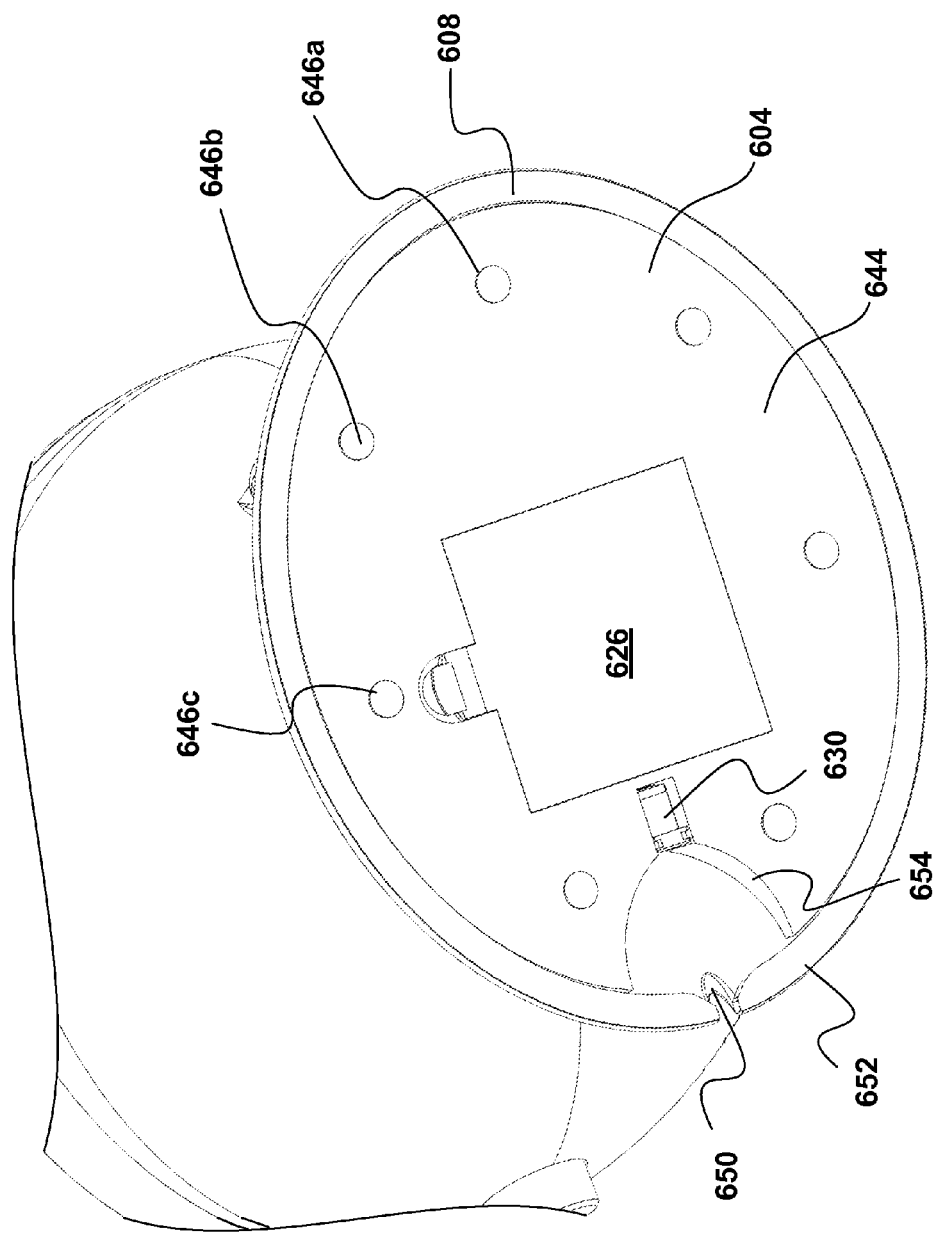
FIG. 24 illustrates a bottom perspective of an embodiment of the stand.

FIG. 24 illustrates an embodiment of the bottom of the dispensing device 100. One or more rubber pads 646a, 646b, 646c, (hereinafter referred to as rubber pads 646) etc. may be provided on the bottom surface 644 of the stand 104 to prevent scratching of the surface upon which the dispensing device may be placed. In addition, the rubber pads 646 may also prevent jiggling or vibrating of the dispensing device 100 against the surface upon which the dispensing device 100 rests. While a number of rubber pads 646 are illustrated, it may be appreciated that a single rubber pad may be contemplated, wherein the rubber pad defines a number of openings therein to accommodate the battery compartment and/or the DC jack or other power supply. Furthermore, it may be appreciated that the rubber pads 646 need not be made of rubber but may be made out of other materials such as foam or felt, which may include thermoplastic materials such as polyolefins, polyurethanes, thermoplastic elastomers, etc. or fabric made of natural or synthetic fibers. In addition, the base 604 of the stand may include a notch 650 in the periphery 652 and the bottom surface 644 of the stand may also a recess or a cutout 654 defined therein to provide access to the DC jack 630 or other power supply.

Referring back to FIG. 22, in some non-exclusive embodiments, dampening material 660 may be provided or retained between at least a portion of the stand 104 and the main body 102, as illustrated or dampening material 660 may be provided between the stand 104 and the main body 102 such that the entire interface 662 (see FIG. 21) includes dampening material. In some non-exclusive embodiments, the dampening material 660 may be adhered to either the stand 104 or the main body 102. The dampening material 660 may absorb a portion of the vibration due to the vibratory motor, preventing jiggling of the dispensing device 100 on a given surface. The dampening material 660 may include felt, foam or another compressible material and may be formed of natural or synthetic rubber, thermoplastic elastomers, polyolefins, or other thermoplastic materials.

Accordingly, the present disclosure relates to a dispensing device. The dispensing device dispensing device includes a stand and a main body supported by the stand, the main body including a wall having a dispensing mouth defined in the wall. The dispensing device further includes a tank retained by the main body for storing items to be dispensed, wherein at least a portion of the tank is made of a transparent material, and a funnel located at a bottom section of the tank, wherein the funnel has a funnel opening defined therein for receiving items to be dispensed. The dispensing device further includes a conveyance path extending from the funnel opening and providing communication between the tank and the dispensing mouth, a ramp positioned at an end of the conveyance path and proximate the dispensing mouth, and an auger rotatably positioned in the conveyance path for conveying items to be dispensed along the conveyance path toward the dispensing mouth, wherein a first end of the auger is positioned adjacent the funnel opening to receive items from the funnel opening and a second end of the auger is positioned adjacent the ramp to convey items to the ramp. The dispensing device further includes a drive motor mechanically coupled to the auger for rotating the auger, an optical sensor mounted above the ramp and in optical communication with the environment proximate to the dispensing mouth for optically sensing a receptacle proximate the dispensing mouth, wherein the optical sensor is optically coupled to the environment along an optical path, wherein at least a portion of the optical path is defined by the dispensing mouth, and circuitry electrically coupled to the sensor and to the drive motor, wherein the circuitry is configured to activate the drive motor for a time period upon receiving an output from the sensor indicating the presence of a receptacle proximal to the dispensing mouth, and wherein the circuitry is configured to control the duration of operation of the drive motor for a specified time period.

While the principles of the invention have been described herein, it is to be understood by those skilled in the art that this description is made only by way of example and not as a limitation as to the scope of the invention. Other non-exclusive embodiments are contemplated within the scope of the present invention in addition to the exemplary non-exclusive embodiments shown and described herein. Modifications and substitutions by one of ordinary skill in the art are considered to be within the scope of the present invention, which is not to be limited except by the following claims.

What is claimed is:

1. A dispensing device, comprising:
   a stand;
   a main body supported by the stand, the main body including a wall having a dispensing mouth defined in the wall;
   a tank retained by the main body for storing items to be dispensed, wherein at least a portion of the tank is made of a transparent material;
   a funnel located at a bottom section of the tank, wherein the funnel has a funnel opening defined therein for receiving items to be dispensed;
   a conveyance path extending from the funnel opening and providing communication between the tank and the dispensing mouth;
   a ramp positioned at an end of the conveyance path and proximate the dispensing mouth;
   an auger rotatably positioned in the conveyance path for conveying items to be dispensed along the conveyance path toward the dispensing mouth, wherein a first end of the auger is positioned adjacent the funnel opening to receive items from the funnel opening and a second end of the auger is positioned adjacent the ramp to convey items to the ramp;
   a drive motor mechanically coupled to the auger for rotating the auger;
   an optical sensor mounted above the ramp and in optical communication with the environment proximate to the dispensing mouth for optically sensing a receptacle proximate the dispensing mouth, wherein the optical sensor is optically coupled to the environment along an optical path, wherein at least a portion of the optical path is defined by the dispensing mouth; and
   circuitry electrically coupled to the sensor and to the drive motor, wherein the circuitry is configured to activate the drive motor for a time period upon receiving an output from the sensor indicating the presence of a receptacle proximal to the dispensing mouth, and wherein the circuitry is configured to control the duration of operation of the drive motor for a specified time period.

2. The dispensing device of claim 1, further comprising a lip extending from the main body to direct items into a receptacle.

3. The dispensing device of claim 1, further comprising an internal ramp cover over the ramp, wherein the sensor is mounted above the internal ramp cover and the internal ramp cover includes at least one opening to allow the sensor to be optically coupled to the environment.

4. The dispensing device of claim 1, wherein the conveyance path includes a conveyance tube positioned within the main body.

5. The dispensing device of claim 4, wherein the main body includes an inner cover mounted in the main body having a recess defined therein, wherein the conveyance tube is supported in the recess.

6. The dispensing device of claim 1, wherein the circuitry comprises a time period adjusting variable resistor configured to adjust the specified time period for the duration of operation of the drive motor.

7. The dispensing device of claim 1, wherein the circuitry is further configured to ignore the output from the sensor for a wait period after the drive motor has been turned on such that the drive motor is not turned on during the wait period.

8. The dispensing device of claim 7, wherein the circuitry comprises a wait period adjusting variable resistor configured to adjust the wait period.

9. The dispensing device of claim 1, wherein the auger includes threads that taper in height proximal at least one end of the auger.

10. A dispensing device, comprising:
    a stand;
    a main body supported by the stand, the main body including a wall having a dispensing mouth defined in the wall;
    a tank retained by the main body for storing items to be dispensed, wherein at least a portion of the tank is made of a transparent material;
    a funnel located at a bottom section of the tank, wherein the funnel has a funnel opening defined therein for receiving items to be dispensed;
    a conveyance path extending from the funnel opening and providing communication between the tank and the dispensing mouth;
    a ramp positioned at an end of the conveyance path and proximate the dispensing mouth;
    an auger rotatably positioned in the conveyance path for conveying items to be dispensed along the conveyance path toward the dispensing mouth, wherein a first end of the auger is positioned adjacent the funnel opening to receive items from the funnel opening and a second end of the auger is positioned adjacent the ramp to convey items to the ramp, wherein the auger includes threads that taper in height proximal at least one end of the auger;
    a drive motor mechanically coupled to the auger for rotating the auger;
    an optical sensor mounted on the main body in optical communication with the environment proximate to the dispensing mouth for optically sensing a receptacle proximate the dispensing mouth, wherein the optical sensor is optically coupled to the environment along an optical path; and
    circuitry electrically coupled to the sensor and to the drive motor, wherein the circuitry is configured to activate the drive motor for a time period upon receiving an output from the sensor indicating the presence of a receptacle proximal to the dispensing mouth, and wherein the circuitry is configured to control the duration of operation of the drive motor for a specified time period, and wherein the circuitry is further configured to ignore the output from the sensor for a wait period after the drive motor has been turned on such that the drive motor is not turned on during the wait period.

* * * * *